United States Patent
Takahashi et al.

(10) Patent No.: US 12,232,010 B2
(45) Date of Patent: *Feb. 18, 2025

(54) RECEPTION APPARATUS, RECEPTION METHOD, TRANSMISSION APPARATUS, AND TRANSMISSION METHOD

(71) Applicant: SATURN LICENSING LLC, New York, NY (US)

(72) Inventors: Kazuyuki Takahashi, Chiba (JP); Jun Kitahara, Shizuoka (JP); Yasuaki Yamagishi, Kanagawa (JP); Naohisa Kitazato, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/476,967

(22) Filed: Sep. 28, 2023

(65) Prior Publication Data
US 2024/0022890 A1    Jan. 18, 2024

Related U.S. Application Data

(63) Continuation of application No. 17/839,237, filed on Jun. 13, 2022, now Pat. No. 11,812,358, which is a
(Continued)

(30) Foreign Application Priority Data

Oct. 21, 2014 (JP) .................................. 2014-214924

(51) Int. Cl.
*H04W 4/00* (2018.01)
*H04H 20/59* (2008.01)
(Continued)

(52) U.S. Cl.
CPC .............. *H04W 4/90* (2018.02); *H04H 20/59* (2013.01); *H04H 20/95* (2013.01);
(Continued)

(58) Field of Classification Search
CPC ......... H04W 4/90; H04H 20/59; H04H 20/95; H04L 1/0079; H04N 21/23614;
(Continued)

(56) References Cited

U.S. PATENT DOCUMENTS 10,015,656 B2   7/2018 Takahashi et al.
10,356,592 B2 * 7/2019 Takahashi ............... H04W 4/90
(Continued)

FOREIGN PATENT DOCUMENTS

JP       2008263616 A     10/2008
JP       2013223093 A  *  10/2013
(Continued)

OTHER PUBLICATIONS

Extended European Search Report issued May 3, 2019 in Application No. 19166245.1-1218, 8 pages.
(Continued)

*Primary Examiner* — Khai M Nguyen
(74) *Attorney, Agent, or Firm* — Chris Kolefas

(57) ABSTRACT

There is provided a reception apparatus including a first acquisition unit which acquires, preceding text format second signaling data to be transmitted in a lower-level layer than an IP layer in a hierarchy of a protocol of an IP transmission system and containing control information independent of a service identified by an IP address, binary format first signaling data containing a flag indicating whether the second signaling data exists in digital broadcast using the IP transmission system, a second acquisition unit which acquires the second signaling data on the basis of the first signaling data, and a control unit which controls opera-
(Continued)

tion of the units which perform various types of processing on the basis of the second signaling data. The present technology can be applied to, for example, a television receiver.

18 Claims, 18 Drawing Sheets

Related U.S. Application Data continuation of application No. 17/037,573, filed on Sep. 29, 2020, now Pat. No. 11,395,123, which is a continuation of application No. 16/510,615, filed on Jul. 12, 2019, now Pat. No. 10,827,337, which is a continuation of application No. 15/992,971, filed on May 30, 2018, now Pat. No. 10,356,592, which is a continuation of application No. 15/519,153, filed as application No. PCT/JP2015/078499 on Oct. 7, 2015, now Pat. No. 10,015,656.

(51) Int. Cl.
| | | |
|---|---|---|
| H04H 20/95 | (2008.01) | |
| H04L 1/00 | (2006.01) | |
| H04N 21/236 | (2011.01) | |
| H04N 21/426 | (2011.01) | |
| H04N 21/434 | (2011.01) | |
| H04W 4/90 | (2018.01) | |
| H04N 21/2383 | (2011.01) | |
| H04N 21/438 | (2011.01) | |
| H04N 21/81 | (2011.01) | |

(52) U.S. Cl.
CPC ..... *H04L 1/0079* (2013.01); *H04N 21/23614* (2013.01); *H04N 21/426* (2013.01); *H04N 21/4345* (2013.01); *H04N 21/2383* (2013.01); *H04N 21/4382* (2013.01); *H04N 21/814* (2013.01)

(58) Field of Classification Search
CPC ............. H04N 21/426; H04N 21/4345; H04N 21/2383; H04N 21/4382; H04N 21/814
See application file for complete search history.

(56) References Cited

U.S. PATENT DOCUMENTS

| | | | | |
|---|---|---|---|---|
| 10,827,337 | B2 * | 11/2020 | Takahashi | H04W 4/90 |
| 11,395,123 | B2 * | 7/2022 | Takahashi | H04L 1/0079 |
| 11,812,358 | B2 * | 11/2023 | Takahashi | H04N 21/23614 |
| 2010/0029313 | A1 | 2/2010 | Dufourd et al. | |
| 2012/0303745 | A1 * | 11/2012 | Lo | H04W 4/021 |
| | | | | 709/217 |
| 2013/0242847 | A1 | 9/2013 | Oh et al. | |
| 2013/0250849 | A1 | 9/2013 | Li et al. | |
| 2014/0120861 | A1 * | 5/2014 | Kwak | H04W 4/90 |
| | | | | 455/404.1 |
| 2015/0095943 | A1 | 4/2015 | Lee et al. | |
| 2016/0165273 | A1 | 6/2016 | Moon et al. | |
| 2016/0241923 | A1 | 8/2016 | Kitazato | |
| 2016/0373807 | A1 | 12/2016 | Kwak et al. | |
| 2017/0048294 | A1 | 2/2017 | Kwak et al. | |
| 2017/0055025 | A1 * | 2/2017 | Lee | H04L 65/65 |
| 2017/0373918 | A1 | 12/2017 | Kwak et al. | |
| 2018/0270334 | A1 | 9/2018 | Kwon et al. | |

FOREIGN PATENT DOCUMENTS

| | | | | |
|---|---|---|---|---|
| JP | 2014508439 | A | 4/2014 | |
| JP | 2017504993 | A | 2/2017 | |
| KR | 20080003550 | A | 1/2008 | |
| WO | WO2008102991 | A1 | 8/2008 | |
| WO | WO2014119961 | A1 | 8/2014 | |
| WO | WO-2015046829 | A1 * | 4/2015 | ........... H04L 1/0041 |
| WO | WO2015133770 | A1 | 9/2015 | |

OTHER PUBLICATIONS

Japanese Office Action issued on Aug. 6, 2019, in Patent Application No. 2016-555168, citing documents AS-AU therein, 14 pages (with unedited computer generated English translation).

European Office Action issued Feb. 13, 2018 in European Application No. 15852568.3, 8 pp.

\* cited by examiner

FIG. 3

| | | FIC/EAS | LLS (SXD/EAD/RRD) |
|---|---|---|---|
| Format | | Binary | XML |
| Purpose | | Quick acquisition (Small size & super short cut) Robust | More detail information Flexible and Extensible |
| Initial Scan | Mobile | O(FIC) | — |
| | stationary | O(FIC) Basic | O(SCD/RRD) Detail |
| Tuning | | Dynamic parameter check | — |
| Emergency Alert | Mobile | O(EAS) | △ (Option EAD) |
| | stationary | O(EAS) high priority | O(EAD) low priority + detail |

FIG. 5A

| Syntax | No. of bits | Mnemonic | Description | Note |
|---|---|---|---|---|
| FIC { | | | | |
|   FIC_protocol_version | 8 | uimsbf | FIC PROTOCOL VERSION | |
|   RF_Allocation_ID | 16 | uimsbf | RF ALLOCATION ID | |
|   SCDRRD_EXISTS | 1 | bslbf | FLAG INDICATING SCD OR RRD EXISTS IN LLS | |
|   Reserved | 7 | | | |
|   if (SEDRRD_EXIST) { | | | | |
|     bbpstream_id | 8 | uimsbf | bbpstream_id IN WHICH LLS EXISTS | |
|   } | | | | |
|   FIC_level_description() | var | | FIC LEVEL DESCRIPTOR | |
|   num_bbpstreams | 8 | uimsbf | THE NUMBER OF BBP STREAMS | |
|   for (i=0; i<num_bbpstreams; i++) { | | | | |
|     bbpstream_id | 8 | uimsbf | BBP STREAM ID | |
|     provider_id | 16 | uimsbf | PROVIDER ID | |
|     provider_descriptor () | | | PROVIDER DESCRIPTOR | |
|     num_services | 8 | uimsbf | THE NUMBER OF SERVICES | |
|     for (j=0; j<num_services; j++) { | | | | |
|       service_id | 16 | uimsbf | SERVICE ID | |
|       service_data_version | 8 | uimsbf | | |
|       service_channel_number | 16 | uimsbf | SERVICE CHANNEL NUMBER | |

FIG. 5B

| | | | |
|---|---|---|---|
| service_category | 5 | uimsbf | SERVICE CATEGORY (EX. VIDEO, AUDIO, ESG, ETC) |
| short_service_name_length | 3 | uimsbf | LENGTH OF SHORT SERVICE NAME |
| short_service_name | 16*m | bslbf | SHORT SERVICE NAME |
| service_status | 1 | uimsbf | SERVICE STATUS (active/suspended/hidden/shown) |
| sp_indicator | 1 | bslbf | FLAG INDICATING SERVICE PROTECTION |
| IP_version_flag | 1 | bslbf | IP PACKET VERSION (IPv4/IPv6) |
| SSC_srv_IP_addr_flag | 1 | bslbf | FLAG INDICATIOG SOURCE IP ADDRESS OF IP PACKET |
| reserved | 4 | bslbf | |
| if (SSC_src_IP_addr_flag){ | | | |
| SSC_src_IPaddr | 32 or 128 | uimsbf | SOURCE IP ADDRESS |
| } | | | |
| SSC_dst_IP_addr | 32 or 128 | uimsbf | DESTINATION IP ADDRESS |
| SSC_dst_port | 16 | uimsbf | PORT NUMBER |
| SSC_TSI | 16 | uimsbf | TSI NUMBER |
| SSC_baseservice | 1 | bslbf | FLAG INDICATING WHETHER BROADCAST SERVICE IS BASIC SERVICE OR OTHER SERVICES |
| reserved | 7 | | |
| } | | | |
| } | | | |
| } | | | |

FIG. 6

| Syntax | No. of bits | Mnemonic | Description | Note |
|---|---|---|---|---|
| EAS | | | | |
|   Emergency_alert_flag | 8 | uimsbf | EMERGENCY ALERT SIGNAL FLAG | |
|   EAD_EXISTS | 1 | bslbf | FLAG INDICATING EAD EXISTS IN LLS | |
|   Reserved | 7 | uimsbf | | |
|   if (EAD_EXISTS) { | | | | |
|     Bbpstream_id | 8 | uimsbf | bbpstream_id IN WHICH LLS EXISTS | |
|   } | | | | |
| } | | | | |

FIG. 7A

| Element/Attribute(white@) | Cardinality | Data Type | Description |
|---|---|---|---|
| SCD | | | |
| @majorProtocolVersion | 0..1 | integer | Major protocol version |
| @minorProtocolVersion | 0..1 | integer | Minor protocol version |
| @RFAllocationId | 1 | integer | physical channel ID |
| @name | 0..1 | string | physical channel name |
| Tuning_RF | 0..n | | Physical parameters |
| @frequency | 1 | integer | Center frequency of this RF channel |
| @preamble | 0..1 | string | Common PHY parameter of this RF channel |
| BBPStream | 1..n | | BBP stream |
| @bbpStreamId | 1 | integer | BBP stream ID |
| @payloadType | 1 | unsignedByte | BBP payload type (e.g. IPv4, IPv6) |
| @name | 0..1 | string | BBP stream name |
| ESGBootstrap | 0..1 | | Access information for ESG |
| ESGProvider | 1..n | | ESG provider |
| @providerName | 1 | string | ESG provider name |
| ESGBroadcasterLocation | 0..1 | | Location of ESG in broadcast |
| @RFAllocationId | 1 | integer | RFAllocation ID for ESG service |
| @BBPStreamId | 1 | integer | BBPStream ID for ESG service |
| @ESGServiceId | 1 | integer | Service ID for ESG service |
| ESGBroadbandLocation | 0..1 | | Location of ESG in broadband |
| ESGUri | 1 | anyURI | URI for ESG |
| ClockReferenceInformation | 0..1 | | Clock reference information(CRI) |
| @sourceIPAddress | 1 | ipAddrType | Source IP address for CRI |
| @destinationIPAddress | 1 | ipAddrType | destination IP address for CRI |
| @portNum | 1 | integer | UDP port number for CRI |

FIG. 7B

| Service | | 1..n | | Service |
|---|---|---|---|---|
| @serviceId | | 1 | integer | Service ID |
| @globalUniqueServiceId | | 1 | integer | Global unique service ID |
| @serviceType | | 1 | enum | Service type (e.g. continued, scripted) |
| @hidden | | 0..1 | integer | Hidden service |
| @hiddenGuide | | 0..1 | integer | Hidden service on ESG |
| @shortName | | 1 | string | Short service name |
| @longName | | 0..1 | string | Long service name |
| @accessControl | | 0..1 | integer | access control |
| SourceOrigin | | 0..1 | | Original service |
| @country | | 1 | integer | Country code |
| @originalRFAllocationId | | 1 | integer | Original RF allocation ID |
| @bbpStreamId | | 1 | integer | BBP stream ID |
| @serviceId | | 1 | integer | Service ID |
| SCBootstrap | | 1 | | Access information for service channel |
| @sourceIPAddress | | 1 | ipAddrType | Source IP address to transmit service |
| @destinationIPAddress | | 1 | ipAddrType | Destination IP address to transmit service |
| @portNum | | 1 | integer | Port number to transmit SCS |
| @tsi | | 1 | integer | FLUTE session TSI to transmit SCG |
| SignalingOverInternet | | 0..1 | anyURI | SCS location of broadband |
| @url | | 1 | | Signaling URI |
| AssociationService | | 0..1 | | |
| @RFAllocationId | | 1 | integer | RF Allocation ID |
| @bbpStreamId | | 1 | integer | BBP Stream ID |
| @serviceId | | 1 | integer | Service ID |

FIG. 8

| Element/Attribute(with@) | Cardinality | Data Type | Description |
|---|---|---|---|
| EAO | | | |
| AutomaticTuningService | 0..1 | | Automatic tuning service(ATS) when wake-up |
| @RFAllocationId | 0..1 | integer | RFAllocation ID for ATS |
| @bbpStreamId | 0..1 | integer | BBP Stream ID for ATS |
| @serviceId | 1 | integer | Service ID for ATS |
| EAMessage | 0..n | | Emergency alert message |
| @eaMessageId | 1 | integer | Emergency alert message ID |
| @eaPriority | 1 | integer | Priority of emergency alert |
| EAMessageData | 0..1 | string | Subtitle message of emergency alert |
| EAApplication | 0..1 | | Emergency alert application |
| @applicationId | 1 | integer | Application ID |
| EAService | 0..1 | | Emergency alert NRT service |
| @serviceId | 1 | integer | NRT service ID |
| @serviceType | 1 | integer | service type (e.g. "nrt") |
| EAWww | 0..n | | Web site of emergency alert information |
| @uri | 1 | anyURI | URI of emergency alert information |

FIG. 9

| Element/Attribute(with@) | Cardinality | Data Type | Description |
|---|---|---|---|
| RMD | | | |
| RatingRegionName | 1 | string | |
| RatingRegion | 1 | integer | Rating region (e.g. "us", "canada", "mexico") |
| Version | 1 | integer | Version |
| Dimension | 1..255 | | |
| RatingDimensionName | 1 | string | Rating dimension name |
| RatingDimension | 1 | integer | Rating dimension code |
| GraduatedScale | 1 | integer | Whether or not the rating values represent a graduated scale |
| DimensionValue | 1..16 | | Dimension value |
| RatingValueText | 1 | string | Rating value in text |
| AbbrevValueText | 1 | string | Abbrev rating value |
| RatingValue | 0..16 | integer | Rating value |
| RatingTag | 1 | integer | Rating tag |

RECEPTION APPARATUS, RECEPTION METHOD, TRANSMISSION APPARATUS, AND TRANSMISSION METHOD

CROSS-REFERENCE TO RELATED APPLICATIONS

This application is a Continuation of U.S. patent application Ser. No. 17/839,237, filed Jun. 13, 2022, which is a Continuation of Ser. No. 17/037,573, filed Sep. 29, 2020, now U.S. Pat. No. 11,395,123, which is a Continuation of U.S. patent application Ser. No. 16/510,615, filed Jul. 12, 2019, now U.S. Pat. No. 10,827,337 issued Nov. 3, 2020, which is a Continuation of U.S. patent application Ser. No. 15/992,971, filed May 30, 2018, now U.S. Pat. No. 10,356,592 issued Jul. 16, 2019, which is a Continuation of U.S. patent application Ser. No. 15/519,153, filed Apr. 13, 2017, now U.S. Pat. No. 10,015,656 issued Jul. 3, 2018, which is a U.S. National Phase of International Patent Application No. PCT/JP2015/078499 filed on Oct. 7, 2015, which claims priority benefit of Japanese Patent Application No. JP 2014-214924 filed in the Japan Patent Office on Oct. 21, 2014. Each of the above-referenced applications is hereby incorporated herein by reference in its entirety.

TECHNICAL FIELD

The present technology relates to a reception apparatus, a reception method, a transmission apparatus, and a transmission method, and more particularly relates to a reception apparatus, a reception method, a transmission apparatus, and a transmission method which can use binary format signaling data and text format signaling data in combination.

BACKGROUND ART

Recently, digital broadcast services have been started in countries (for example, see Patent Document 1). In digital broadcast, signaling data defining various parameters used in tuning processing or the like by a television receiver is assumed to be described in a binary format and in a text format such as the extensible markup language (XML).

CITATION LIST PATENT DOCUMENT

Patent Document 1: Japanese Patent Application Laid-Open No. 2008-263616

SUMMARY OF THE INVENTION

Problems to be Solved by the Invention

Incidentally, binary format signaling data has smaller data size and needs fewer transmission bands compared to text format signaling data, and thus has advantages in being acquired quickly and the like. On the other hand, text format signaling data has advantages in extensibility, readability, and the like compared to binary format signaling data.

As described above, since the binary format signaling data and the text format signaling data each have advantages and disadvantages as its characteristics, it has been demanded that various uses are to be supported by using the binary format signaling data and the text format signaling data in combination.

The present technology has been made in view of such a situation, and is to use binary format signaling data and text format signaling data in combination.

Solutions to Problems

A reception apparatus in a first aspect of the present technology is a reception apparatus including a first acquisition unit which acquires, preceding text format second signaling data to be transmitted in a lower-level layer than an internet protocol (IP) layer in a hierarchy of a protocol of an IP transmission system and containing control information independent of a service identified by an IP address, binary format first signaling data containing a flag indicating whether the second signaling data exists in digital broadcast using the IP transmission system, a second acquisition unit which acquires the second signaling data on the basis of the first signaling data, and a control unit which controls operation of the units which perform various types of processing on the basis of the second signaling data.

The reception apparatus in the first aspect of the present technology may be an independent apparatus, or an internal block constituting one apparatus. Furthermore, a reception method in the first aspect of the present technology is a reception method corresponding to the above reception apparatus in the first aspect of the present technology.

In the reception apparatus and the reception method in the first aspect of the present technology, preceding text format second signaling data to be transmitted in a lower-level layer than an IP layer in a hierarchy of a protocol of an IP transmission system and containing control information independent of a service identified by an IP address, binary format first signaling data containing a flag indicating whether the second signaling data exists is acquired in digital broadcast using the IP transmission system, the second signaling data is acquired on the basis of the first signaling data, and operation of the units which perform various types of processing is controlled on the basis of the second signaling data.

A transmission apparatus in a second aspect of the present technology is a transmission apparatus including a generation unit which generates text format second signaling data to be transmitted in a lower-level layer than an IP layer in a hierarchy of a protocol of an IP transmission system and containing control information independent of a service identified by an IP address, and binary format first signaling data containing a flag indicating whether the second signaling data exists in digital broadcast using the IP transmission system, and a transmission unit which transmits the first signaling data and the second signaling data by the digital broadcast using the IP transmission system such that a reception apparatus acquires the first signaling data preceding the second signaling data.

The transmission apparatus in the second aspect of the present technology may be an independent apparatus, or an internal block constituting one apparatus. A transmission method in the second aspect of the present technology is a transmission method corresponding to the above transmission apparatus in the second aspect of the present technology.

In the transmission apparatus and the transmission method in the second aspect of the present technology, text format second signaling data to be transmitted in a lower-level layer than an IP layer in a hierarchy of a protocol of an IP transmission system and containing control information independent of a service identified by an IP address, and binary format first signaling data containing a flag indicating whether the second signaling data exists are generated in digital broadcast using the IP transmission system, and the first signaling data and the second signaling data are transmitted by the digital broadcast using the IP transmission system such that a reception apparatus acquires the first signaling data preceding the second signaling data.

Effects of the Invention

According to a first aspect and a second aspect of the present technology, it is possible to use binary format signaling data and text format signaling data in combination.

Note that, effects are not necessarily limited to the effects described here and may be any one of the effects described in the present disclosure.

BRIEF DESCRIPTION OF DRAWINGS

FIG. 3 is a diagram illustrating comparison of characteristics of an FIC and an LLS.

FIGS. 5A and 5B together show a diagram illustrating syntax of a binary format FIC.

FIG. 6 is a diagram illustrating syntax of a binary format EAS.

FIGS. 7A and 7B together show a diagram illustrating syntax of an XML format SCD.

FIG. 8 is a diagram illustrating syntax of an XML format EAD.

FIG. 9 is a diagram illustrating syntax of an XML format RRD.

MODE FOR CARRYING OUT THE INVENTION

Hereinafter, an embodiment of the present technology is described with reference to the drawings. Note that, the description is made in the following order.
1. Configuration of System
2. Outline of IP transmission system digital broadcast
3. Example of Syntax
4. Configuration of Each apparatus
5. Processing procedure performed by Each apparatus
6. Modified example
7. Configuration of Computer <1. Configuration of System
(Configuration Example of Broadcast Communication System)

Figure 1:
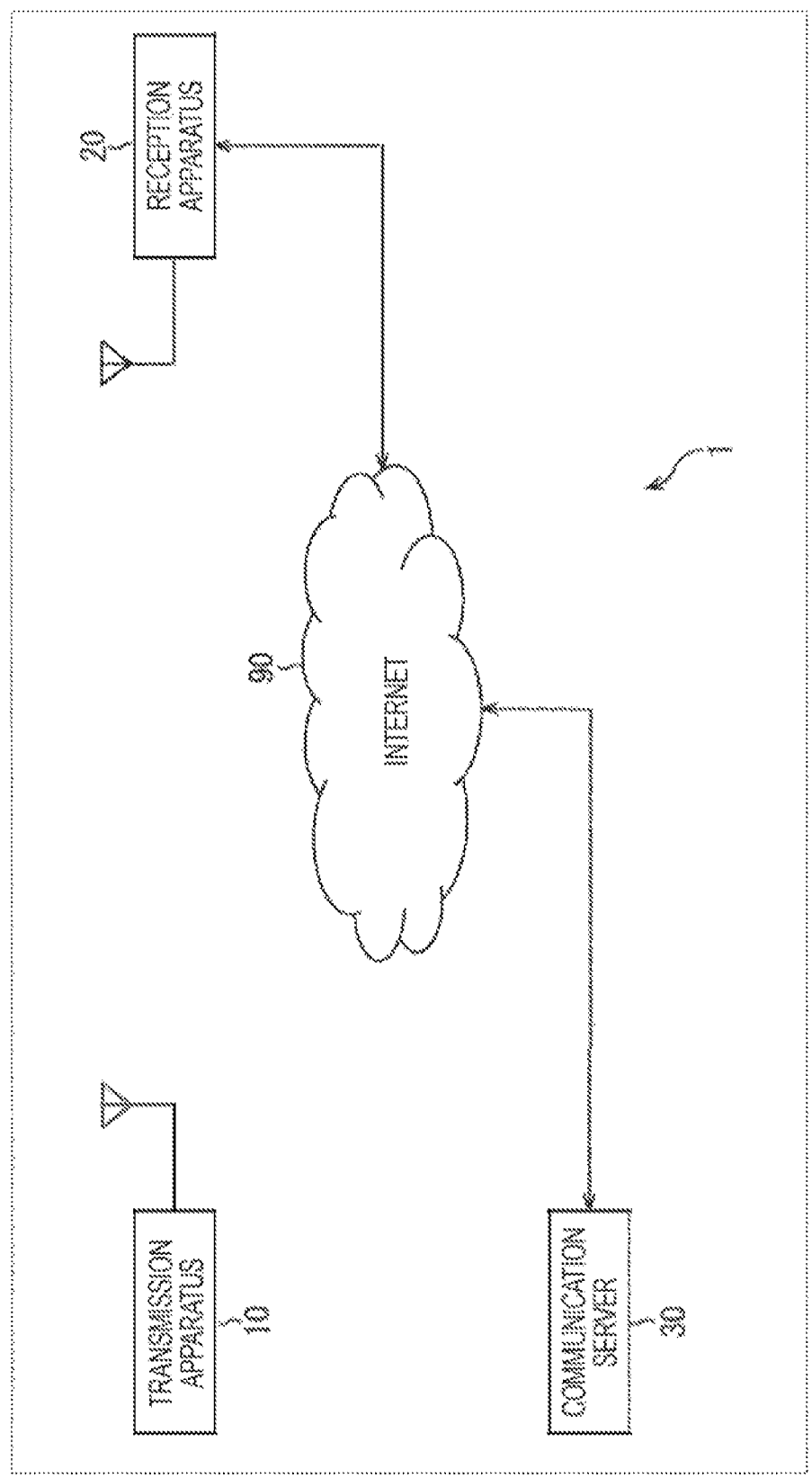
FIG. 1 is a diagram illustrating a configuration example of a broadcast communication system.

In FIG. 1, a broadcast communication system 1 is a system for providing a service such as a program. The broadcast communication system 1 includes a transmission apparatus 10, a reception apparatus 20, and a communication server 30. Furthermore, in FIG. 1, the reception apparatus 20 is mutually connected with the communication server 30 via an internet 90.

The transmission apparatus 10 is, for example, a transmitter supporting a predetermined standard of the terrestrial digital television broadcast, supplied by a broadcasting organization, and installed in a broadcast station. Note that, in the embodiment of the present technology, a standard of, for example, the Advanced Television Systems Committee standards (ATSC) or the like can be used as a terrestrial digital television broadcast standard.

The transmission apparatus 10 transmits a stream of components, such as video, audio, and subtitles, constituting a service (for example, a program) together with signaling data by a broadcast wave of digital broadcast.

Note that, the signaling data contains low layer signaling (LLS) signaling data independent of a service, service signaling channel(SSC) signaling data in a service unit, a fast information channel (FIC), and an emergency alert system (EAS), and these are detailedly described later.

The reception apparatus 20 is, for example, a fixed receiver, such as a television receiver or a set-top box, supporting the predetermined standard of the terrestrial digital television broadcast, and installed in, for example, each user's house. Furthermore, the reception apparatus 20 has a communication function, and can access the communication server 30 via the internet 90.

The reception apparatus 20 receives a broadcast wave of the digital broadcast transmitted from the transmission apparatus 10, and acquires signaling data transmitted by the broadcast wave of the digital broadcast. The reception apparatus 20 connects, on the basis of the acquired signaling data, to a stream (of the components constituting) the service transmitted by the broadcast wave of the digital broadcast from the transmission apparatus and reproduces (outputs) the video and the audio obtained from the stream.

The communication server 30 streaming-distributes, in response to the request from the reception apparatus 20, the stream of the components, such as video, audio, and subtitles, constituting the service(for example, a program) via the internet 90. Furthermore, the communication server 30 distributes the signaling data via the internet 90 in response to the request from the reception apparatus 20.

The reception apparatus 20 connects to the stream of (the components constituting) the service to be streaming-distributed from the communication server 30 via the internet 90 on the basis of the signaling data from the transmission apparatus 10 or the communication server 30, and reproduces (outputs) the video and the audio obtained from the stream.

Note that, the communication server 30 can distribute, for example, various types of information such as emergency alert information on an emergency alert in addition to the components and the signaling data. For example, the reception apparatus 20 can obtain and display the emergency alert information by accessing the communication server 30 via the internet 90.

<2. Outline of IP Transmission System Digital Broadcast>

In a digital broadcast standard in countries, the Moving Picture Experts Group phase 2-Transport Stream (MPEG2-TS) method is used as a transmission system. However, it is assumed that more advanced services are provided by using an internet protocol (IP) transmission system in which an IP packet used in a communication field is used for digital broadcast in future. Especially, in the ATSC 3.0 which has been preparing for the next-generation broadcast standard in the U.S., digital broadcast using the IP transmission system is expected to be used.

(System Pipe Model)

Figure 2:
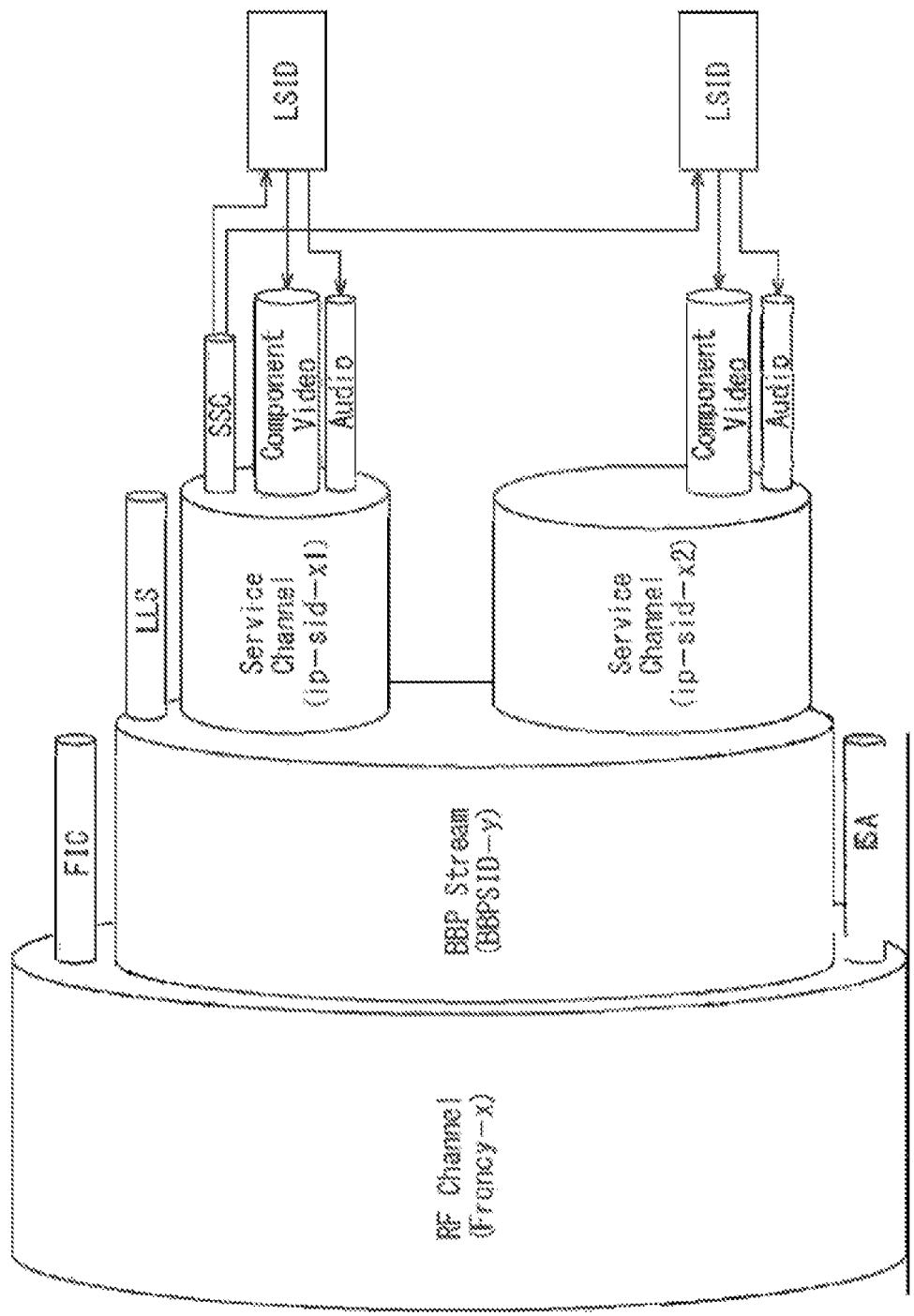
FIG. 2 is a diagram illustrating a system pipe model of IP transmission system digital broadcast.

FIG. 2 is a diagram illustrating a system pipe model of IP transmission system digital broadcast.

In FIG. 2, a physical channel (RF Channel) supporting a broadcast wave having a predetermined frequency band transmits a base band packet (BBP) stream, a fast information channel (FIC), and an emergency alert system (EAS). Furthermore, the BBP stream transmits low layer signaling (LLS), and two service channels.

The FIC shows the configurations of the BBP stream and the service. The EAS is information on an emergency alert. Note that, the FIC and the EAS are binary format signaling data.

The LLS is low layer signaling data independent of a service. For example, as the LLS, LLS metadata, such as a service configuration description (SCD), an emergency alerting description (EAD), or a region rating description (RRD), is transmitted. Note that, the LLS metadata is text format (XML format) signaling data described in a markup language, for example, the XML or the like.

The SCD shows the configurations of the BBP stream and the service. Furthermore, the SCD contains attribute/setting information in a service unit, bootstrap information for connecting to an ESG service or an SSC, or the like. The EAD contains information on an emergency alert. The RRD contains rating information.

Here, FIG. 3 illustrates the comparison between the binary format FIC/EAS and the XML format LLS metadata (SCD, EAD, or RRD). In other words, as illustrated in FIG. 3, the binary format FIC/EAS has a smaller data size and needs fewer transmission bands compared to the XML format LLS metadata (SCD, EAD, or RRD), and thus has advantages in being acquired quickly and the like. On the other hand, the XML format LLS metadata (SCD, EAD, or RRD) has advantages in extensibility, readability, and the like compared to the binary format FIC or EAS.

Returning to the explanation of FIG. 2, the service channels(hereinafter, also referred to as a service) is constituted by a service signaling channel (SSC) and components, such as video, audio, and subtitles, constituting a program. Note that, a common IP address is assigned to the elements constituting each service, and the components or the SSC can be packetized for each service using the IP address.

The SSC is signaling data in a service unit. For example, as the SSC, SSC metadata, such as a user service bundle description (USBD), a session description protocol (SDP), a media presentation description (MPD), an initialization segment (IS), a service parameter description (SPD), or an LCT session instance description (LSID) is transmitted.

The USBD contains reference information for referring to the SSC metadata, such as the MPD, or the SDP. Note that, the USBD can be referred to as a user service description (USD). The SDP contains a service attribute in a service unit, configuration information and an attribute of the stream, filter information, location information, or the like.

The MPD is information for managing reproduction the stream of the components transmitted in a service unit, and contains information such as a segment uniform resource locator (URL). The IS is an initialization segment to a media segment (MS) in a real-time object delivery over unidirectional transport (ROUTE) session.

Note that, it is assumed that the USBD, USD, MPD, SPD, and IS standardized by any one of the third Generation Partnership Project (3GPP), the Moving Picture Expert Group (MPEG), or the Internet Engineering Task Force (IETF) are referred to.

The SPD defines a service level parameter. The LSID is an extension of a file delivery table (FDT) of the file delivery over unidirectional transport (FLUTE) for a real time service, and is management information of the stream of the components transmitted for each ROUTE session. Note that, the LSID may be transmitted in a ROUTE session different from other SSC metadata.

Here, the components, such as video or audio, and the SSC signaling data are transmitted in the ROUTE session. The ROUTE is an extension of the FLUTE (RFC6276, 5775, 5651) for a broadcast live service. Note that, the ROUTE can be referred to as a FLUTE+(FLUTE plus) or a FLUTE enhancement.

In the ROUTE session, a file to be transmitted is managed as one object by a transport object identifier (TOI). Furthermore, a plurality of objects is managed as one session by a transport session identifier (TSI). In other words, it is possible to specify a specific file by two types of identification information of the TSI and the TOI in the ROUTE session.

Note that, the SSC metadata is text format (XML format) signaling data described in a markup language, for example, the XML or the like.

Furthermore, an RF allocation ID is assigned to a broadcast wave having a predetermined frequency band (RF Channel), for example, for each broadcasting organization. Furthermore, a BBP stream ID is assigned to one or a plurality of BBP streams transmitted by each broadcast wave. Moreover, a service ID is assigned to one or a plurality of services transmitted by each BBP stream.

As described above, a configuration corresponding to a combination (hereinafter, referred to as a triplet) of a network ID, a transport stream ID, and a service ID used in the MPEG2-TS method is used as an ID system of the IP transmission system, and a BBP stream configuration and a service configuration in the network is indicated by the triplet.

Consequently, it is possible to match the ID system with the MPEG2-TS method which has been widely spread currently. Note that, the RF allocation ID and the BBP stream ID in the ID system of the IP transmission system correspond to the network ID and the transport stream ID in the MPEG2-TS method.

Note that, although not illustrated in FIG. 2, the BBP stream may transmit a network time protocol (NTP) and an electronic service guide (ESG) service in addition to the LLS and the service channel. The NTP is time information. The ESG service is an electronic service guide defined in the Open Mobile Alliance (OMA).

(Configurations of FIC and EAS)

Figure 4:
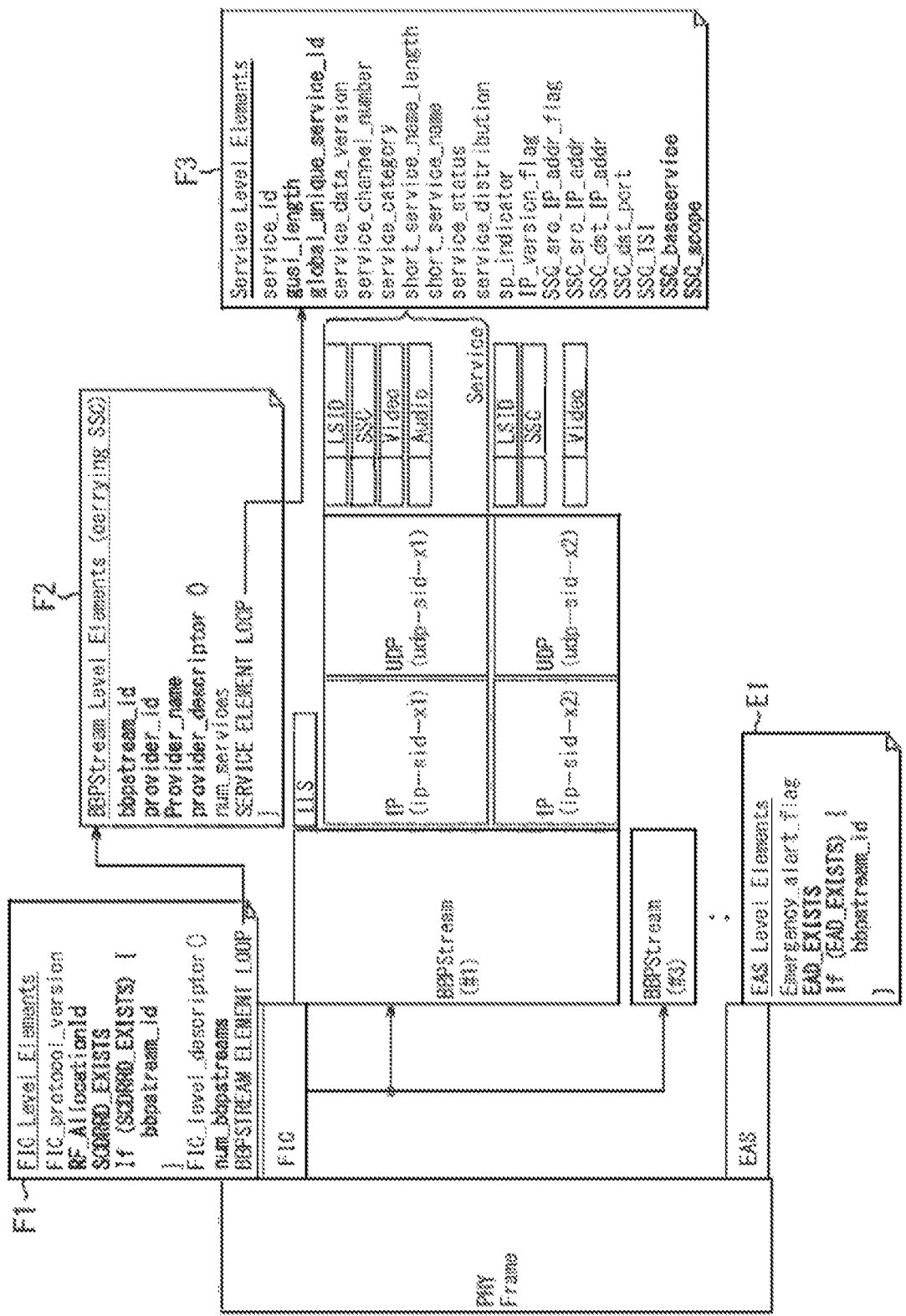
FIG. 4 is a diagram illustrating configurations of an FIC and an EAS.

FIG. 4 is a diagram illustrating configurations of the FIC and the EAS.

In FIG. 4, a physical frame (PHY Frame) defined in the ATSC standard contains a flag indicating that the FIC exists (hereinafter, referred to as a FIC flag) as a preamble signal, when the FIC is transmitted. When the FIC flag is detected from the preamble signal, the reception apparatus 20 can detect and acquire the FIC.

The FIC is constituted by an FIC level element FI, a BBP stream level element F2, and a service level element F3. Note that, in the FIC, newly defined elements are described in bold.

In the FIC level element FI, information in an FIC unit is arranged. In FIG. 4, the FIC level element FI is constituted by FIC_protocol version, RF Allocation ID, SCDRRD EXISTS, FIC level descriptor( ) num_bbpstreams, and BBP-STREAM ELEMENT LOOP.

SCDRRD EXISTS is a flag indicating that the SCD or the RRD exists in the LLS (hereinafter, referred to as an SCD/RRD flag) When the SCD/RRD flag indicates that the SCD or the RRD exists in the LLS, bbpstream_idis arranged in the FIC level element FI. The reception apparatus 20 acquires the SCD or the RRD from the LLS transmitted in the BBP stream identified by the BBP stream ID.

The number of BBP streams is designated in num_bbpstreams, and a BBP stream loop (BBPSTREAM ELEMENT LOOP) is repeated according to the number. The BBP stream level element F2 according to the number of loops is arranged in the BBP stream loop.

In the BBP stream level element F2, information in a BBP stream unit is arranged.

In FIG. 4, the BBP stream level element F2 is constituted by bbpstream_id, provider id, provider name, provider descriptor( ), num services, and SERVICE ELEMENT LOOP.

The number of services is designated in num_services, and a service loop (SERVICE ELEMENT LOOP) is repeated according to the number. The service level element F3 according to the number of loops is arranged in the service loop.

In the service level element F3, information in a service unit is arranged. In FIG. 4, the service level element F3 is constituted by service id, gusi length, global unique service id, service data version, service channel number, service category, short service name length, short service name, service status, service distribution, sp indicator, IP version flag, SSC src IP addr flag, SSC src IP addr, SSC dst IP addr, SSC dst_port, SSC TSI, SSC baseservice, and SSC scope.

The reception apparatus 20 acquires the SSC signaling data transmitted in the ROUTE session on the basis of the IP address, the port number, and the TSI of the SSC specified by the service level element F3. Here, since the TSI and the TOI of the video and audio corresponding to the MIME type are described in the LSID acquired as the SSC signaling data, the reception apparatus 20 can specify the IP address, the port number, the TSI, and the TOI of the video and the audio by referring to the LSID.

The reception apparatus 20 acquires, on the basis of the IP address, the port number, the TSI, and the TOI, the video data and the audio data transmitted in the ROUTE session. Then, the reception apparatus 20 performs buffering processing by temporarily storing the video data and the audio data acquired via the broadcast in a buffer, and reproduces the video and the audio of the program according to the tuned service by further performing rendering processing.

Note that, the detailed configuration of the FIC is described later with reference to FIGS. 5A and 5B. Furthermore, in the FIC, provider name, gusi length, global unique service id, service distribution, SSC scope of the above elements are not necessarily arranged.

The EAS is constituted by an EAS level element EI. In FIG. 4, the EAS level element EI is constituted by Emergency_alart flag, and EAD EXISTS. Note that, in the EAS, newly defined elements are described in bold.

EAD EXISTS is a flag indicating that the EAD exists in the LLS (hereinafter, referred to as an EAD flag). When the EAD flag indicates that the EAD exists in the LLS, bbpstream_id is arranged in the EAS level element EI. The reception apparatus 20 acquires the EAD from the LLS transmitted in the BBP stream identified by the BBP stream ID.

The reception apparatus 20 can display the emergency alert information on the basis of the EAD.

Note that, the detailed configuration of the EAS is described later with reference to FIG. 6.

<3. Example of Syntax>

(Syntax of FIC

FIGS. 5A and 5B together show a diagram illustrating syntax of a binary format FIC. Note that, in FIGS. 5A and 5B, newly defined elements are shown in bold.

Version information of an FIC protocol is designated in 8-bit FIC protocol version. An RF allocation ID is designated in 16-bit RF Allocation ID.

1-bit SCDRRD EXISTS is the SCD/RRD flag indicating that the SCD or the RRD exists in the LLS. Following a 7-bit reserved area, when the SCD/RRD flag indicates that the SCD or the RRD exists in the LLS, a BBP stream ID of the BBP stream in which the LLS exists is designated as 8-bit bbpstream_id.

FIC level descriptor( ) is an FIC level descriptor.

The number of BBP streams is designated in 8-bit num_bbpstreams. The BBP stream loop (BBPSTREAM ELEMENT LOOP) is repeated according to the number of BBP streams. The following descriptions are designated in the BBP stream loop.

A BBP stream ID is designated in 8-bit bbpstream_id. A provider ID is designated in 16-bit provider id.

provider descriptor( ) is a provider descriptor.

The number of services is designated in 8-bit num services. The service loop (SERVICE ELEMENT LOOP) is repeated according to the number of services. The following descriptions are designated in the service loop.

A service ID is designated in 16-bit service id.

Version information of service data is designated in 8-bit service data version. A service channel number of is designated in 16-bit service channel number. A service category is designated in 5-bit service category. For example, video, audio, ESG, or the like is designated as the category.

The length of a short service name is designated in 3-bit short service name length. A short service name is designated in 16*m-bit short service name A service status is designated in 1-bit service status. A flag indicating service protection is designated in 1-bit sp indicator.

A flag indicating an IP packet version is designated in 1-bit IP version flag. A flag indicating a source IP address of the IP packet is designated in 1-bit SSC src IP addr flag. Following a 4-bit reserved area, when SSC src IP addr flag indicates that the IP address exists, the source IP address is designated as 32-bit or 128-bit SSC src IP addr.

A destination IP address is designated in 32-bit or 128-bit SSC dst IP addr. A port number is designated in 16-bit SSC dst_port. A TSI is designated in 16-bit SSC TSI.

A flag indicating whether the broadcast service is the basic service or other services is designated in 1-bit SSC baseservice. Note that, following SSC baseservice, the 7-bit reserved area is provided.

(Syntax of EAS)

FIG. 6 is a diagram illustrating syntax of a binary format EAS. Note that, in FIG. 6, newly defined elements are shown in bold.

An emergency alert signal flag is designated in 8-bit Emergency_alart flag.

1-bit EAD EXISTS is an EAD flag indicating that the EAD exists in the LLS. Following a 7-bit reserved area, when the EAD flag indicates that the EAD exists in the LLS, a BBP stream ID of the BBP stream in which the LLS exists is designated as 8-bit Bbpstream_id.

Note that, each syntax of the FIC and the EAS described with reference to FIGS. 5A, 5B, and 6 is an example, and other syntax may be used.

(Syntax of SCD)

FIGS. 7A and 7B together show a diagram illustrating syntax of an XML format SCD. Note that, in the elements and the attributes in FIGS. 7A and 7B, "@" is attached to the attributes. Furthermore, the indented elements and attribute are designated to their higher-level elements. These relationships are similar to other syntax to be described later.

As illustrated in FIGS. 7A and 7B, an SCD element as a root element is a higher-level element of a majorProtocolversion attribute, a minorProtocolversion attribute, an RFallocationid attribute, a name attribute, a Tuning RF element, and a BBPStream element.

Protocol version information is designated in the major-Protocolversion attribute and the minorProtocolversion attribute. An RF allocation ID of a broadcast station in a physical channel unit is designated in the RFallocationid attribute. A name of the broadcast station in the physical channel unit is designated in the name attribute.

Information on tuning is designated in the Tuning RF element. The Tuning RF element is a higher-level element of a frequency attribute, and a Preamble attribute. A frequency when a predetermined band is tuned is designated in the frequency attribute. Control information for a physical layer is designated in the Preamble attribute.

Information on one or a plurality of BBP streams is designated in the BBPStream element. The BBPStream element is a higher-level element of a bbpStreamid attribute, a payloadType attribute, the name attribute, an ESGBootstrap element, a ClockReferenceinformation element, and a Service element.

A BBP stream ID is designated in the bbpStreamid attribute. When a plurality of BBP streams is arranged, the BBP streams are identified by the BBP stream ID. A payload type of the BBP stream is designated in the payloadType attribute. For example, $^{11}$ipv4$^{11}$, $^{11}$ipv6$^{11}$, or the like is designated as the payload type. $^{11}$ipv4$^{11}$ indicates the Internet Protocol version 4 (IPv4). $^{11}$ipv6$^{11}$ indicates the Internet Protocol Version 6 (IPv6). A BBP stream name is designated in the name attribute.

ESG bootstrap information is designated in the ESGBootstrap element. The ESG bootstrap information enables the access to the ESG. The ESGBootstrap element is a higher-level element of an ESGProvider element. Information on the ESG for each ESG provider is designated in the ESGProvider element. The ESGProvider element is a higher-level element of a providerName attribute, an ESGBroadcastLocation element, and an ESGBroadbandLocation element.

An ESG provider name is designated in the providerName attribute. When the ESG is transmitted by the broadcast, the ESG service is designated in the ESGBroadcastLocation element by the RF allocation ID, the BBP stream ID, and the service ID (triplet) designated by the RFallocationid attribute, the BBPStreamid attribute, and an ESGServiceid attribute. When the ESG is transmitted via communication, a URI for accessing a file of the ESG is designated in the ESGBroadbandLocation element by an ESGuri attribute.

Information on time information (for example, the NTP) is designated in the ClockReferenceinformation element. The ClockReferenceinformation element is a higher-level element of a sourceIPAddress attribute, a destinationIPAddress attribute, and a portNum attribute. IP addresses of the source and the destination for transmitting the time information are designated in the sourceIPAddress attribute and the destinationIPAddress attribute. A port number for transmitting the time information is designated in the portNum attribute.

Information on one or a plurality of services is designated in the Service element. The Service element is a higher-level element of a serviceid attribute, a globalUniqueServiceid attribute, a serviceType attribute, a hidden attribute, a hiddenGuide attribute, a shortName attribute, a longName attribute, an accesControl attribute, a SourceOrigin element, an SCBootstrap element, a SignalingOverinternet element, and an AssociationService element.

A service ID is designated in the serviceid attribute. When a plurality of services is arranged, the services are identified by the service ID. A global unique service ID is designated in the globalUniqueServiceid attribute. For example, the global unique service ID can link the ESG-tuned service with the USBD.

Service type information is designated in the serviceType attribute. For example, "continued" or "scripted" is designated as the type information. "continued" indicates a video or audio service, and "scripted" indicates an NRT service respectively.

Whether the service identified by the service ID is a hidden service is designated in the hidden attribute and the hiddenGuide attribute. For example, when "on" is designated as the attribute value, the service is not displayed. Furthermore, when "off" is designated as the attribute value, the service is displayed. For example, when "on" is designated as the hidden attribute, the service cannot be tuned by the operation of a remote controller. Furthermore, for example, when "on" is designate as the hiddenGuide attribute, the service is not displayed on the ESG.

A name of the service identified by the service ID is designated in the shortName attribute and the longName attribute. However, the name of the service should be designated within, for example, seven characters in the shortName attribute. Whether the service identified by the service ID is encrypted is designated in the accesControl attribute. For example, when "on" is designated as the accesControl attribute, it is indicated that the service is encrypted, and when "off" is designated, it is indicated that the service is not encrypted.

Information for identifying the service is designated in the SourceOrigin element. The SourceOrigin element is a higher-level element of a country attribute, an originalRFAllocationid attribute, a bbpStreamid attribute, and a serviceid attribute. A country code is designated in the country attribute. An original RF allocation ID is designated in the originalRFAllocationid attribute. The original RF allocation ID is an ID for identifying a broadcast network, and the same value is used when the service is retransmitted. A BBP stream ID is designated in the bbpStreamid attribute. A service ID is designated in the serviceid attribute. In other words, a unique ID can be allocated to each service using the country code, the original RF allocation ID, the BBP stream ID, and the service ID.

SC bootstrap information is designated in the SCBootstrap element. The SC bootstrap information enables the access to the service channel, and the SSC signaling data can be acquired. The SCBootstrap element is a higher-level element of a sourceIPAddress attribute, a destinationIPAddress attribute, a portNum attribute, and a tsi attribute.

IP addresses of the source and the destination for transmitting the service are designated in the sourceIPAddress attribute and the destinationIPAddress attribute. A port number for transmitting the SSC is designated in the portNum attribute. A TSI in the ROUTE session for transmitting the SSC is designated in the tsi attribute.

SSC broadband location information is designated in the SignalingOverinternet element. Information on the SSC signaling data to be transmitted via the communication is designated by the SSC broadband location information. The SignalingOverinternet element is a higher-level element of a uri attribute. A URI indicating the acquisition source of the SSC signaling data is designated in the uri attribute.

Information on a related association service is designated in the AssociationService element. The AssociationService element is a higher-level element of an RFAllocationid attribute, a bbpStreamid attribute, and a serviceid attribute. The related association service is designated by the RF allocation ID, the BBP stream ID, and the service ID (triplet) designated by the RFAllocationid attribute, the bbpStreamid attribute, and the serviceid attribute.

Note that, with regard to the cardinality, when "1" is designated, one element or attribute should be designated, and when "0..1" is designated, it is arbitrary whether the element or the attribute is designated. Furthermore, when "1.n" is designated, one or more elements or attributes are designated, and when "0.n" is designated, it is arbitrary whether one or more elements or attributes are designated. The meanings of the cardinality are similar to other syntax to be described later.

Syntax of EAD)

FIG. 8 is a diagram illustrating syntax of an XML format EAD.

As illustrated in FIG. 8, an EAD element as a root element is a higher-level element of an AutomaticTuningService element and an EAMessage element. The AutomaticTuningService element is for designating an automatic tuning service when Wake-up. The AutomaticTuningService element is a higher-level element of an RFAllocationid attribute, a bbpStreamid attribute, and a serviceid attribute.

A network ID of the automatic tuning service is designated in the RFAllocationid attribute. A BBP stream ID of the automatic tuning service is designated in the BBPStreamid attribute. A service ID of the automatic tuning service is designated in the serviceid attribute. In other words, when the AutomaticTuningService element appears, the service designated by the triplet indicated by the attributes is tuned. However, the RFAllocationid attribute and the BBPStreamid attribute in the triplet are not essential, and the serviceid attribute is only required to be designated if, for example, the BBP stream same as the EAD is to be designated.

An emergency alert information (emergency information) message is designated in the EAMessage element. The EAMessage element is a higher-level element of an eaMessageid attribute, an eaPriority attribute, an EAMessageData element, an EAApplication element, an EAService element, and an EAWww element.

An emergency alert information (emergency information) ID is designated in the eaMessageid attribute. Emergency alert information (emergency information) priority is designated in the eaPriority attribute. Subtitle information for emergency alert information (emergency information) is designated in the EAMessageData element.

Information on an application for an emergency alert is designated in the EAApplication element. The EAApplication element is a higher-level element of an applicationid attribute. An application ID is designated in the applicationid attribute.

Information on an NRT service for an emergency alert is designated in the EAService element. The EAService element is a higher-level element of a serviceid attribute and a serviceType attribute. A service ID is designated in the serviceid attribute. Service type information is designated in the serviceType attribute. For example, "nrt" is designated as the service type information. "nrt" indicates the NRT service.

Information on an emergency information site is designated in the EAWww element. The EAWww element is a higher-level element of a uri attribute. An emergency information site URI is designated in the uri attribute.

(Syntax of RRD)

FIG. 9 is a diagram illustrating syntax of an XML format RRD.

As illustrated in FIG. 9, an RRD element as a root element is a higher-level element of a RatingRegionName element, a RatingRegion element, a TableVersion element, and a Dimension element. A rating region name is designated in the RatingRegionName element. A rating region code is designated in the RatingRegion element. For example, "us", "canada", "mexico", or the like is designated as the code. RRD version information is designated in the TableVersion element.

The Dimension element is a higher-level element of a RatingDimensionName element, a RatingDimension element, a GraduatedScale element, and a DimensionValue element. A rating dimension name is designated in the RatingDimensionName element. A rating dimension code is designated in the RatingDimension element. A scale is designated in the GraduatedScale element.

A dimension value is designated in the DimensionValue element. The DimensionValue element is a higher-level element of a RatingValueText element, an AbbrevValueText element, a RatingValue element, and a RatingTag element. Rating information on, for example, how to group age limits is designated in these attributes.

Note that, each syntax of the SCD, EAD, RRD described with reference to FIGS. 7A to 9 is an example, and other syntax may be used.

<4. Configuration of Each Apparatus>

Figure 10:
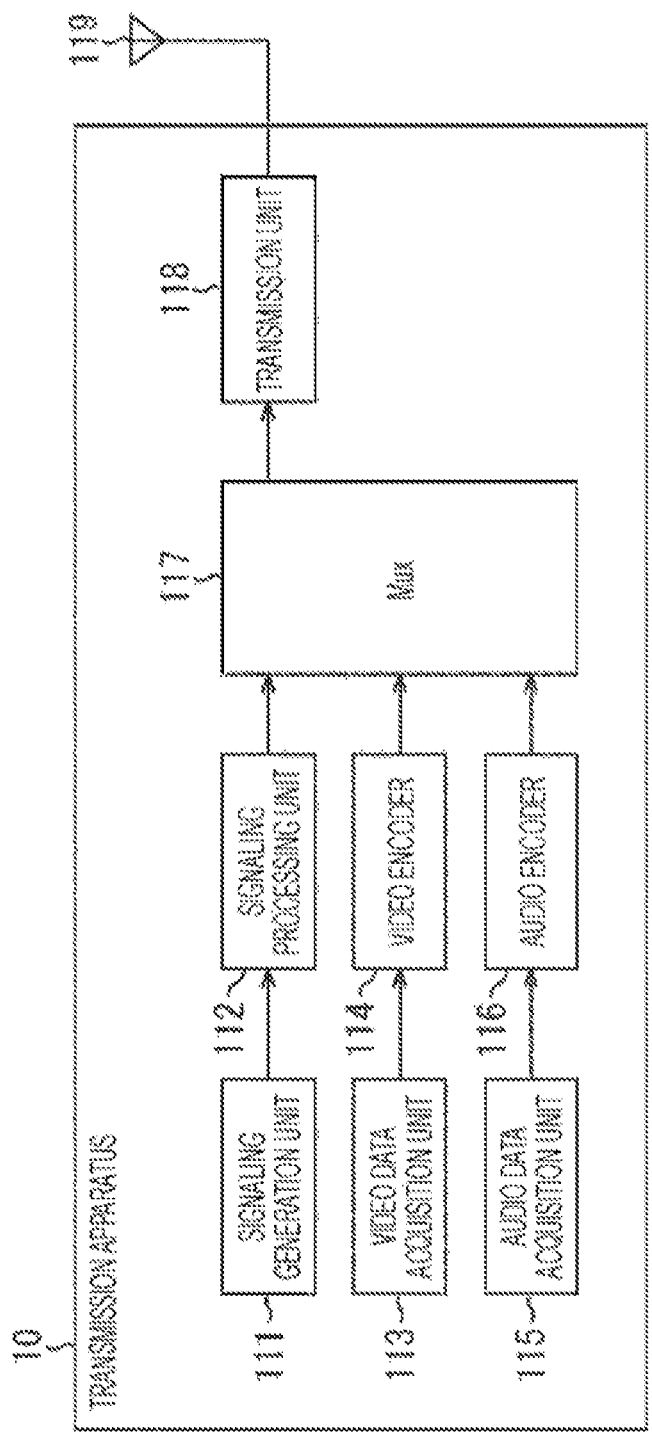
FIG. 10 is a diagram illustrating a configuration of an embodiment of a transmission apparatus to which the present technology is applied.
Figure 11:
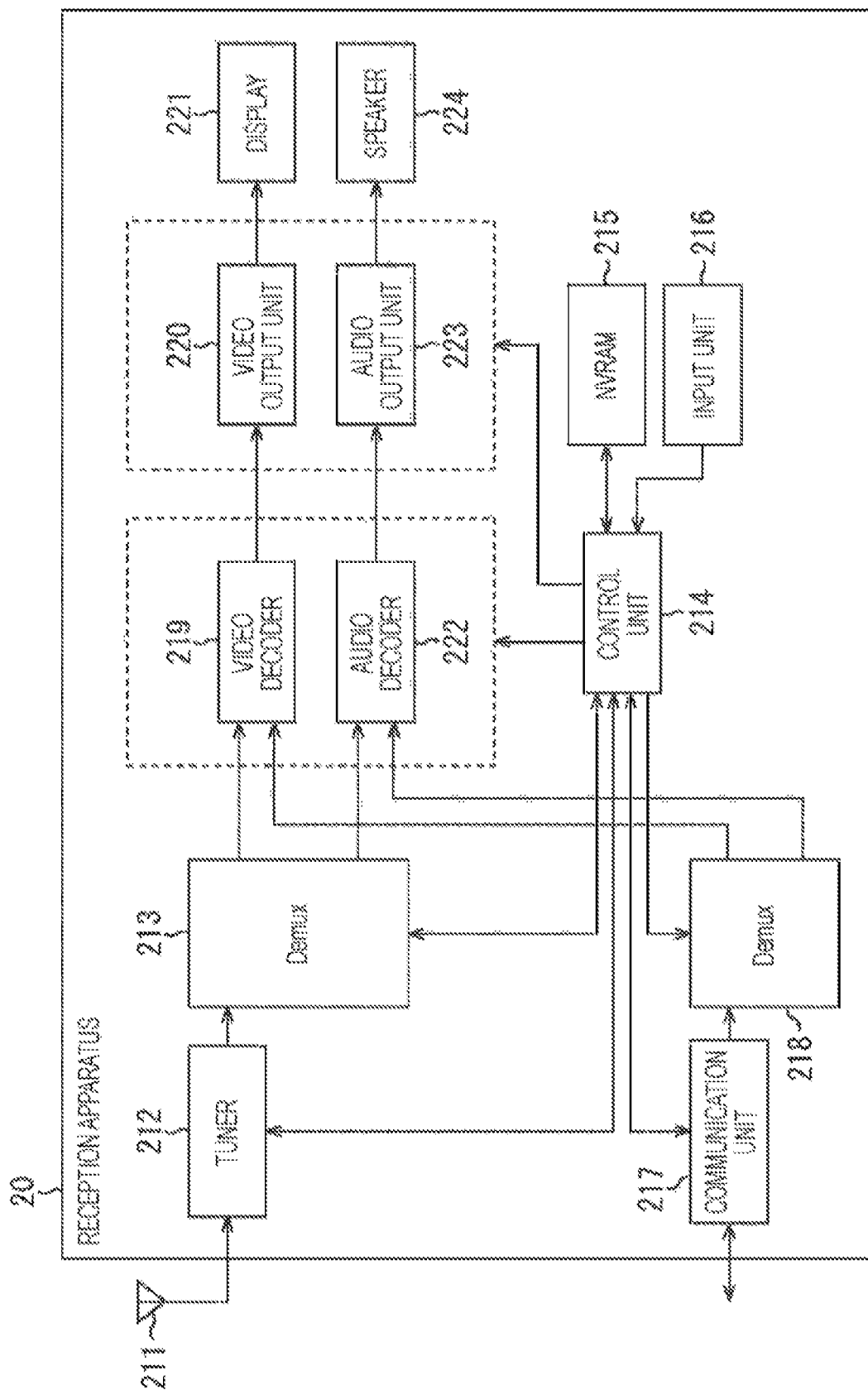
FIG. 11 is a diagram illustrating a configuration of an embodiment of a reception apparatus to which the present technology is applied.
Figure 12:
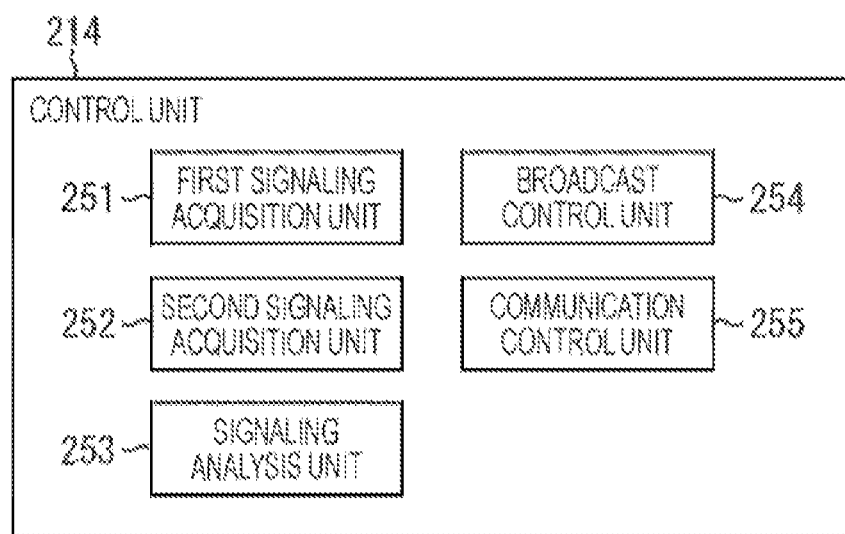
FIG. 12 is a diagram illustrating a functional configuration example of a control unit in FIG. 11.

Next, with reference to FIGS. 10 to 12, the configurations of the transmission apparatus 10 and the reception apparatus 20 are described as detailed configurations of the apparatuses constituting the broadcast communication system 1 in FIG. 1.

"Configuration of Transmission Apparatus"

FIG. 10 is a diagram illustrating a configuration of an embodiment of a transmission apparatus to which the present technology is applied.

As illustrated in FIG. 10, the transmission apparatus 10 includes a signaling generation unit 111, a signaling processing unit 112, a video data acquisition unit 113, a video encoder 114, an audio data acquisition unit 115, an audio encoder 116, an Mux 117, and a transmission unit 118.

The signaling generation unit 111 acquires original data for generating signaling data from an external server, an incorporated storage, or the like. The signaling generation unit 111 generates signaling data using the original data of the signaling data, and supplies it to the signaling processing unit 112.

The signaling processing unit 112 processes the signaling data supplied from the signaling generation unit 111, and supplies it to the Mux 117. Here, the FIC and the EAS are generated as the signaling data in addition to LLS signaling data constituted by the LLS metadata, such as the SCD, and SSC signaling data constituted by the SSC metadata, such as the USBD or the LSID.

The video data acquisition unit 113 acquires video data supplied from an external server, an incorporated storage, a video camera, or the like, and supplies it to the video encoder 114. The video encoder 114 encodes the video data supplied from the video data acquisition unit 113 in compliance with an encoding method such as the Moving Picture Experts Group (MPEG), and supplies it to the Mux 117.

The audio data acquisition unit 115 acquires audio data supplied from an external server, an incorporated storage, a microphone, or the like, and supplies it to the audio encoder 116. The audio encoder 116 encodes the audio data supplied from the audio data acquisition unit 115 in compliance with an encoding method such as the MPEG, and supplies it to the Mux 117.

The Mux 117 generates a BBP stream by multiplexing a stream of the signaling data from the signaling processing unit 112, a stream of the video from the video encoder 114, and a stream of the audio from the audio encoder 116, and supplies it to the transmission unit 118. The transmission unit 118 transmits the BBP stream supplied from the Mux 117 via an antenna 119 as a broadcast wave of the digital broadcast using the IP transmission system (digital broadcast signal).

"Configuration of Reception Apparatus"

FIG. 11 is a diagram illustrating a configuration of an embodiment of a reception apparatus to which the present technology is applied.

As illustrated in FIG. 11, the reception apparatus 20 includes a tuner 212, a Demux 213, a control unit 214, an NVRAM 215, an input unit 216, a communication unit 217, a Demux 218, a video decoder 219, a video output unit 220, a display 221, an audio decoder 222, an audio output unit 223, and a speaker 224.

The tuner 212 extracts and demodulates, from the broadcast wave, which is received via an antenna 211, of the digital broadcast using the IP transmission system (digital broadcast signal), the digital broadcast signal according to the user's tuning operation under the control of the control unit 214, and supplies the BBP stream obtained as a result to the Demux 213.

The Demux 213 separates the BBP stream supplied from the tuner 212 into video, audio, and signaling data under the control of the control unit 214. The Demux 213 supplies the video data, the audio data, and the signaling data to the video decoder 219, the audio decoder 222, and the control unit 214 respectively.

The control unit 214 controls the operation of the units of the reception apparatus 20. Furthermore, the control unit 214 connects to the stream of the components transmitted via the broadcast or the communication on the basis of the signaling data supplied from the Demux 213 or the communication unit 217, and controls the operation of the units to control the reproducing the components. Note that, the detailed configuration of the control unit 214 is described later with reference to FIG. 12.

The NVRAM 215 is a non-volatile memory, and stores various types of data under the control of the control unit 214. The input unit 216 supplies an operation signal to the control unit 214 according to the user's operation.

The communication unit 217 connects to the communication server 30 via the internet 90 under the control of the control unit 214, and requests the distribution of the stream of the components. The communication unit 217 receives the stream of the components streaming-distributed from the communication server 30 via the internet 90, and supplies it to the Demux 218. Furthermore, the communication unit 217 receives the data, such as the SSC signaling data, from the communication server 30 via the internet 90 under the control of the control unit 214, and supplies it to the control unit 214.

The Demux 218 separates the stream of the components supplied from the communication unit 217 into video data and audio data under the control of the control unit 214, and supplies the video data and the audio data to the video decoder 219 and the audio decoder 222 respectively.

The video data is supplied to the video decoder 219 from the Demux 213 or the Demux 218. The video decoder 219 decodes the video data in compliance with a decoding method such as the MPEG under the control of the control unit 214, and supplies it to the video output unit 220. The video output unit 220 outputs the video data supplied from the video decoder 219 to the display 221. Thus, for example, the video of the program is displayed on the display 221.

The audio data is supplied to the audio decoder 222 from the Demux 213 or the Demux 218. The audio decoder 222 decodes the audio data in compliance with a decoding method such as the MPEG under the control of the control unit 214, and supplies it to the audio output unit 223. The audio output unit 223 outputs the audio data supplied from the audio decoder 222 to the speaker 224. Thus, for example, the audio corresponding to the video of the program is output from the speaker 224.

Note that, when the reception apparatus 20 is a set-top box or the like in FIG. 11, the display 221 and the speaker 224 may not be included. Furthermore, the reception apparatus 20 may not include a communication function such as the communication unit 217.

(Functional Configuration Example of Control Unit)

FIG. 12 is a diagram illustrating a functional configuration example of the control unit 214 in FIG. 11.

In FIG. 12, the control unit 214 includes a first signaling acquisition unit 251, a second signaling acquisition unit 252, a signaling analysis unit 253, a broadcast control unit 254, and a communication control unit 255.

The first signaling acquisition unit 251 acquires the FIC or the EAS, and supplies it to the signaling analysis unit 253. The signaling analysis unit 253 analyses the FIC or the EAS supplied from the first signaling acquisition unit 251, and supplies the analysis result to the second signaling acquisition unit 252.

The second signaling acquisition unit 252 acquires the LLS metadata, such as the SCD, the RRD, or the EAD transmitted in the LLS, on the basis of the analysis result supplied from the signaling analysis unit 253, and supplies it to the signaling analysis unit 253. The signaling analysis unit 253 analyses the LLS metadata supplied from the second signaling acquisition unit 252, and supplies the analysis result to the second signaling acquisition unit 252, the broadcast control unit 254, or the communication control unit 255.

The second signaling acquisition unit 252 acquires the SSC metadata, such as the USBD or the LSID transmitted in the SSC, on the basis of the analysis result supplied from the signaling analysis unit 253, and supplies it to the signaling analysis unit 253. The signaling analysis unit 253 analyses the SSC metadata supplied from the second signaling acquisition unit 252, and supplies the analysis result to the broadcast control unit 254 or the communication control unit 255.

The broadcast control unit 254 controls, on the basis of the analysis result supplied from the signaling analysis unit 253, the operation of the units which perform various types of processing to the data acquired via the broadcast. The communication control unit 255 controls, on the basis of the analysis result supplied from the signaling analysis unit 253, the operation of the units which perform various types of processing to the data acquired via the communication.

<5. Processing Procedure Performed by Each Apparatus>

Figure 13:
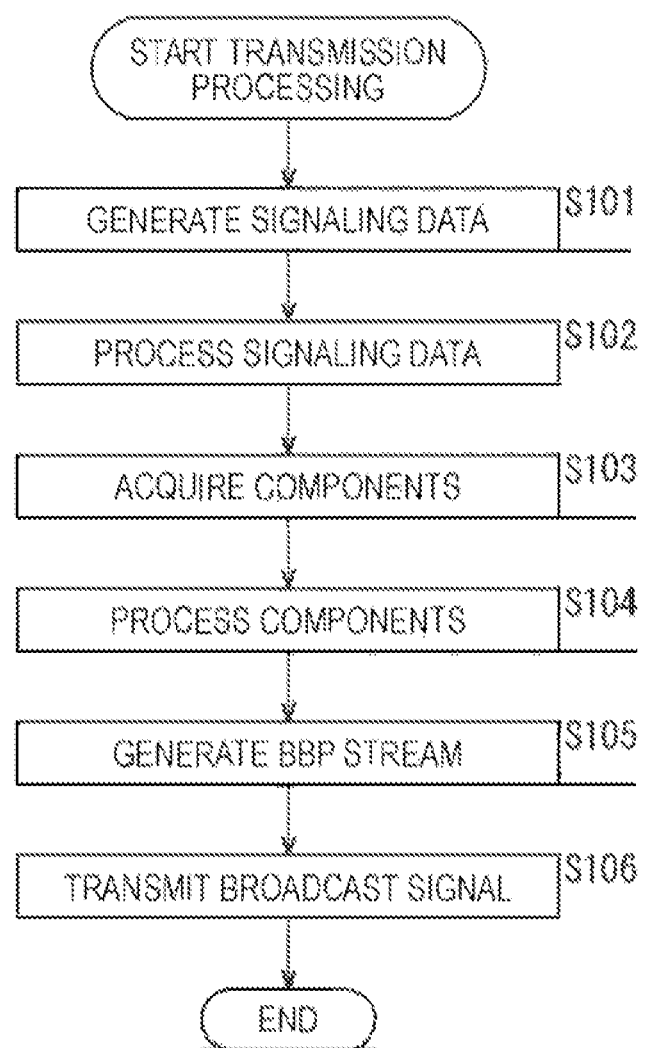
FIG. 13 is a flowchart explaining a transmission processing procedure.
Figure 14:
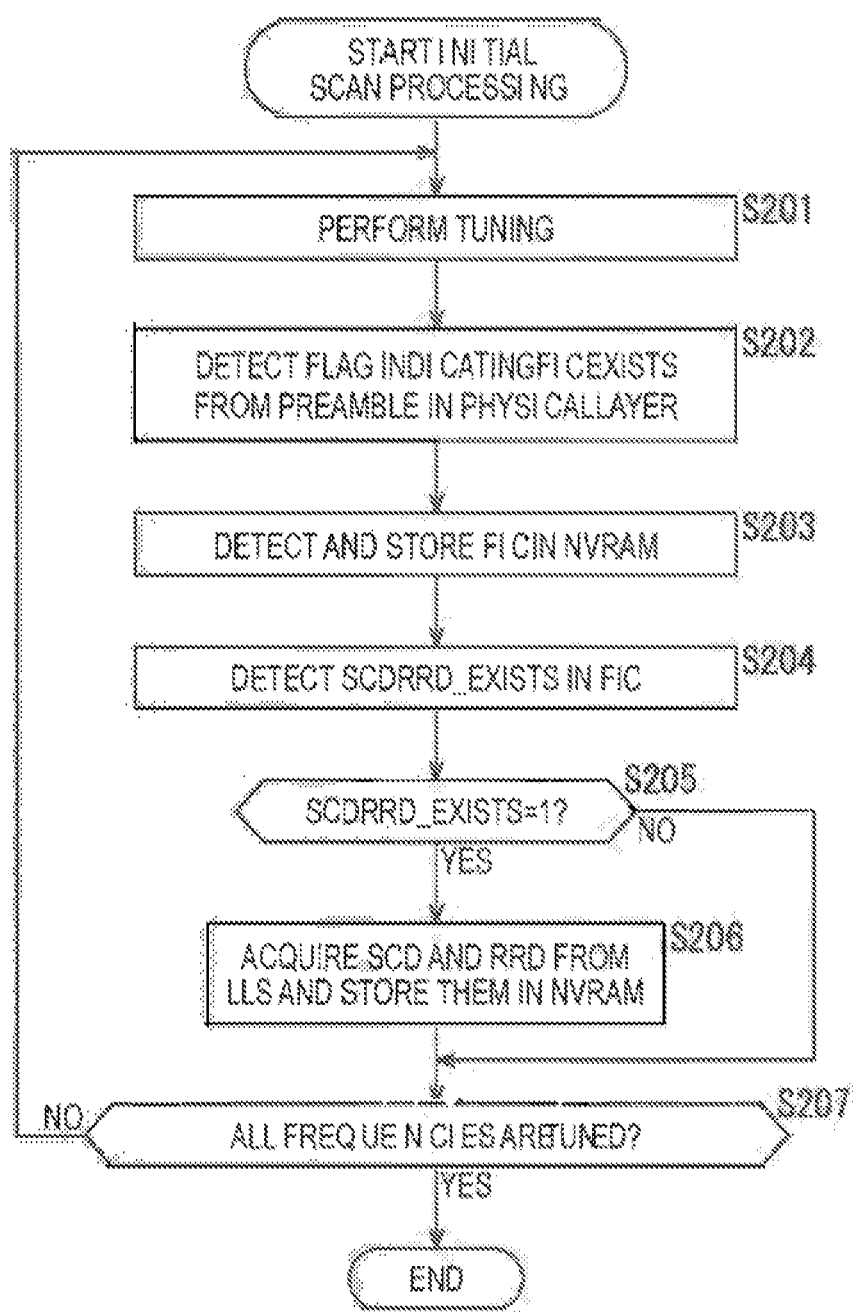
FIG. 14 is a flowchart explaining an initial scan processing procedure.
Figure 15:
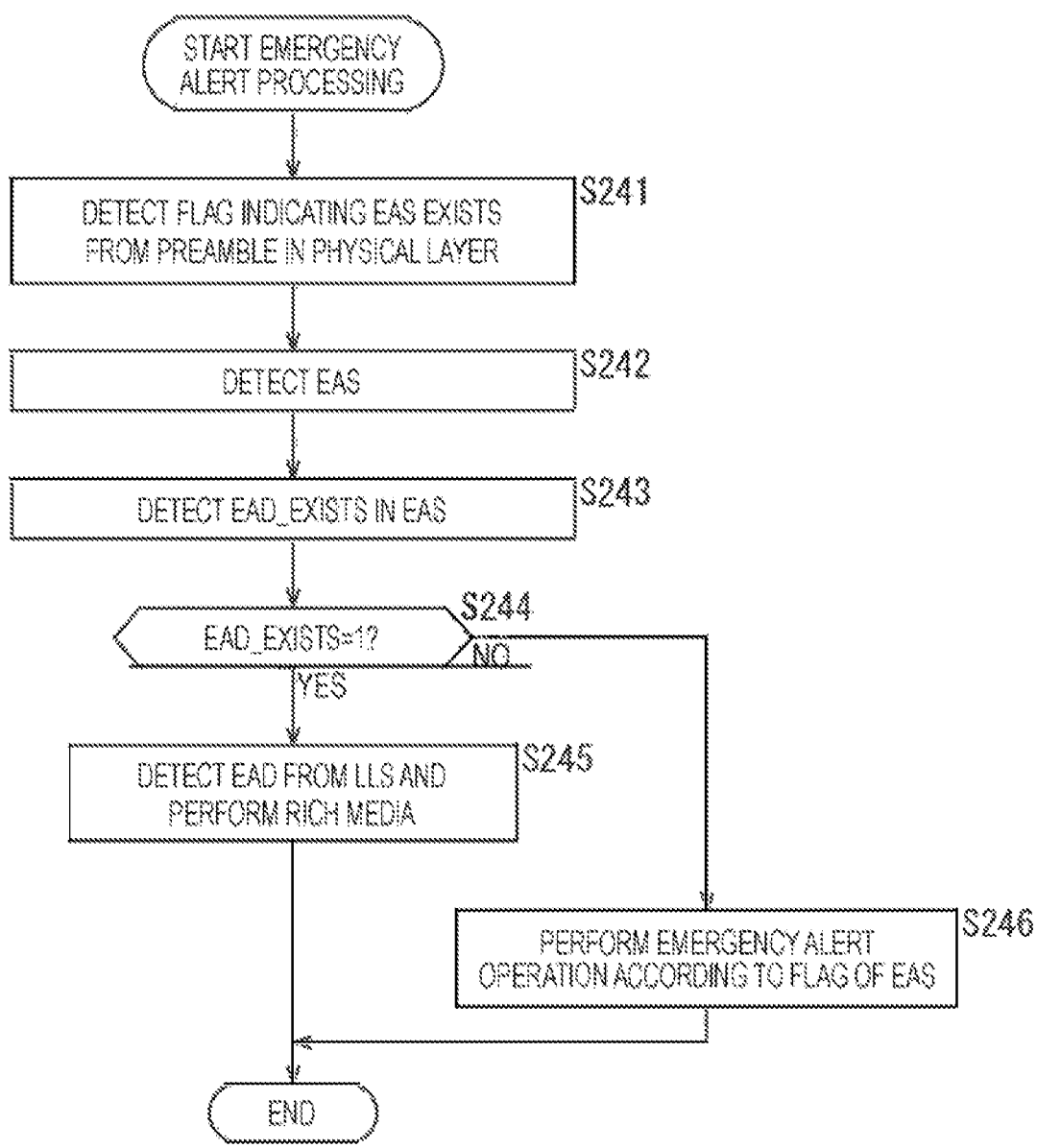
FIG. 15 is a flowchart explaining an emergency alert processing procedure.

Next, with reference to the flowcharts in FIGS. 13 to 15, procedures of specific processing performed by the apparatuses constituting the broadcast communication system 1 in FIG. 1 are described.

(Transmission Processing)

First, a procedure of transmission processing performed by the transmission apparatus 10 is described with reference to the flowchart in FIG. 13.

In step S101, the signaling generation unit 111 generates signaling data using original data of the signaling data, and supplies it to the signaling processing unit 112. In step S102, the signaling processing unit 112 processes the signaling data supplied from the signaling generation unit 111, and supplies it to the Mux 117.

Here, the FIC and the EAS are generated as the signaling data in addition to the LLS metadata, such as the SCD, and the SSC metadata such as the USBD or the LSID. However, the signaling data may be generated by an external server. In this case, the signaling generation unit 111 simply supplies the signaling data supplied from the external server to the signaling processing unit 112.

In step S103, the video data acquisition unit 113 acquires video data as the components from the external server or the like, and supplies it to the video encoder 114. Furthermore, in step S103, the audio data acquisition unit 115 acquires audio data as the components from the external server or the like, and supplies it to the audio encoder 116.

In step S104, the video encoder 114 encodes the video data as the components in compliance with an encoding method such as the MPEG, and supplies it to the Mux 117. Furthermore, in step S104, the audio encoder 116 encodes the audio data as the components in compliance with an encoding method such as the MPEG, and supplies it to the Mux 117.

In step S105, the Mux 117 generates a BBP stream by multiplexing the signaling data from the signaling processing unit 112, a stream of the video from the video encoder 114, and a stream of the audio from the audio encoder 116, and supplies it to the transmission unit 118.

In step S106, the transmission unit 118 transmits the BBP stream supplied from the Mux 117 as a digital broadcast signal via the antenna 119. When the processing in step S116 is terminated, the transmission processing in FIG. 13 is terminated.

The transmission processing procedure has been described.

(Initial Scan Processing)

Next, an initial scan processing procedure performed by the reception apparatus 20 is described with reference to the flowchart in FIG. 14. Note that, initial scan processing is performed when, for example, an initial scan event occurs such as the time when the power is supplied for the first time.

In step S201, the broadcast control unit 254 tunes a predetermined frequency of a broadcast wave by controlling the tuner 212. In step S202, the broadcast control unit 254 detects an FIC flag indicating that the FIC exists from a preamble signal in the physical layer of the broadcast wave by controlling the tuner 212.

In step S203, the broadcast control unit 254 detects the FIC from the broadcast wave by controlling the tuner 212. Thus, the first signaling acquisition unit 251 acquires the FIC and stores it in the NVRAM 215.

In step S204, the signaling analysis unit 253 reads and analyses the FIC stored in the NVRAM 215 by the processing in step S203, and detects an SCD/RRD flag (SCDRRD EXISTS) in the FIC. Then, the signaling analysis unit 253 determines whether "1" is designated in the SCD/RRD flag (SCDRRD EXISTS) on the basis of the analysis result by the processing in step S204 (S205).

When it is determined that "1" is designated in the SCD/RRD flag (SCDRRD EXISTS) in step S205, the processing proceeds to step S206. In step S206, the second signaling acquisition unitacquires the SCD and the RRD transmitted in the LLS by controlling the Demux 213, and stores them in the NVRAM 215. When the processing in step S206 is terminated, the processing proceeds to step S207.

On the other hand, when it is determined that "0" is designated in the SCD/RRD flag (SCDRRD EXISTS) in step S205, the processing in step S206 is skipped, and the processing proceeds to step S207.

In step S207, the broadcast control unit 254 determines whether all frequencies are tuned. When it is determined that all frequencies are not tuned in step S207, the processing returns to step S201, and the following processing is repeated. Then, by repeating the processing from steps S201 to S207, all frequencies are tuned, and when the SCD or the like as tuning information is stored in the NVRAM 215 (Yes in S207), the initial scan processing in FIG. 14 is terminated.

The initial scan processing procedure has been described.

(Emergency Alert Processing)

Next, an emergency alert processing procedure performed by the reception apparatus 20 is described with reference to the flowchart in FIG. 15. Note that, emergency alert processing is performed when, for example, the program tuned by the user is being reproduced or the like.

In step S241, the broadcast control unit 254 detects a flag indicating that the EAS exists from a preamble signal in the physical layer of the broadcast wave by controlling the tuner 212.

In step S242, the broadcast control unit 254 detects the EAS from the broadcast wave by controlling the tuner 212. Thus, the first signaling acquisition unit 251 acquires the EAS, and supplies it to the signaling analysis unit 253.

In step S243, the signaling analysis unit 253 analyses the EAS detected by the processing in step S242, and detects an EAD flag (EAD EXISTS) in the EAS. Then, the signaling analysis unit 253 determines whether "1" is designated in the EAD flag (EAD EXISTS) on the basis of the analysis result by the processing in step S243 (S244).

When it is determined that "1" is designated in the EAD flag (EAD EXISTS) in step S244, the processing proceeds to step S245. In step S245, the second signaling acquisition unit 252 acquires the EAD transmitted in the LLS by controlling the Demux 213, and supplies it to the signaling analysis unit 253. The signaling analysis unit 253 analyses the EAD from the second signaling acquisition unit 252, and supplies the analysis result to the broadcast control unit 254.

Then, the broadcast control unit 254 performs the rich media by controlling the operation of the units on the basis of the analysis result from the signaling analysis unit 253. For example, the broadcast control unit 254 superimposes and displays (the subtitle information of) the emergency alert information corresponding to (the EAMessageData element of the EAMessage element of) the EAD on the video of the reproducing program.

Note that, when the user instructs the reception apparatus 20 to display emergency-alert-detail information (more detailed information than the emergency alert information), the communication control unit 255 controls the communication unit 217, and accesses the communication server 30 via the internet 90 according to the URI of the emergency information site designated by (the uri attribute of the EAWww element of the EAMessage element of) the EAD. Thus, the emergency-alert-detail information acquired from the emergency information site is displayed.

On the other hand, when it is determined that "0" is designated in the EAD flag (EAD EXISTS) in step S244, the processing proceeds to step S246. In step S246, the broadcast control unit 254 performs the emergency alert operation according to the emergency alert signal flag of the EAS by controlling the operation of the units on the basis of the analysis result in step S243.

The emergency alert processing procedure has been described.

6. Modified Example

Note that, the ATSC which is the method used in the U.S. and the like as a standard of the terrestrial digital television broadcast has been described in the above description, but the present technology may be applied to the method of the Integrated Services Digital Broadcasting (ISDB) used in Japan and the like or the method of the Digital Video Broadcasting (DVB) used in countries in Europe and the like. Furthermore, the present technology may be applied to the satellite digital television broadcast, the digital wired television broadcast, or the like as well as the terrestrial digital television broadcast.

Furthermore, "D" which is the abbreviation of Description has been used as a name of signaling information in the above description, but "T" which is the abbreviation of Table may be used. For example, a service configuration description (SCD) can be described as a service configuration table (SCT). Furthermore, for example, a service parameter description (SPD) can be described as a service parameter table (SPT). However, the difference in names is merely a formality of "Description" or "Table", and the substantial contents of each signaling information are not different.

Moreover, the elements and attributes in the case in which the signaling information is described in a markup language such as the XML have been described in the above description, the names of the elements and attributes are examples, and other names may be used. For example, an RF channel ID defined in the SCD or the like may be referred to as a network ID, an RF allocation ID (RF Alloc ID), or the like. However, the difference in names is merely a formality, and the substantial contents of elements or attributes are not different.

Furthermore, the above BBP stream can be called other names such as a data pipe or a physical layer pipe (PLP). The SSC can be referred to as service channel signaling (SCS). However, the difference in names is merely a formality, and the substantial contents of them are not different.

<7. Configuration of Computer>

Figure 16:
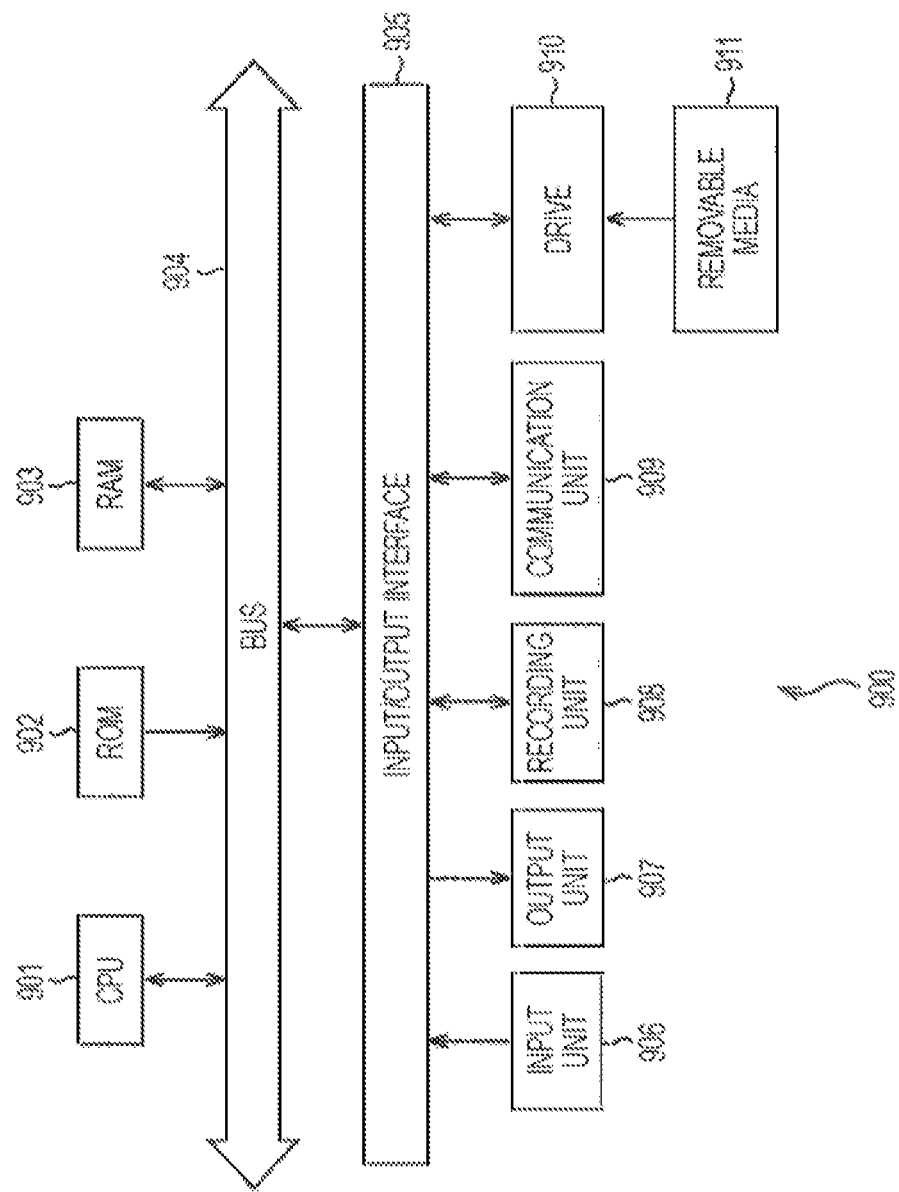
FIG. 16 is a diagram illustrating a configuration example of a computer.

The above series of processing can be performed by hardware or by software. When the series of processes is performed by software, a program constituting the software is installed in a computer. FIG. 16 is a diagram illustrating a hardware configuration example of a computer which performs the above series of processing by a program.

In a computer 900, a central processing unit (CPU) 901, a read only memory (ROM) 902, and a random access memory (RAM) 903 are connected with each other by a bus 904. The bus 904 is further connected with an input/output interface 905. The input/output interface 905 is connected with an input unit 906, an output unit 907, a recording unit 908, a communication unit 909, and a drive 910.

The input unit 906 includes a keyboard, a mouse, a microphone, and the like. The output unit 907 includes a display, a speaker, and the like. The recording unit 908 is a hard disk, a non-volatile memory, or the like. The communication unit 909 includes a network interface and the like. The drive 910 drives a removable medium 911 such as a magnetic disc, an optical disc, a magneto-optical disc, or a semiconductor memory.

In the computer 900 configured as described above, the CPU 901 loads a program stored in the ROM 902 or the recording unit 908 into the RAM 903 via the input/output interface 905 and the bus 904 and executes the program, and the above series of processing is thereby performed.

The program executed by the computer 900 (the CPU 901) can be provided by being recorded in the removable medium 911 as, for example, a package media or the like. Furthermore, the program can be provided via a wired or wireless transmission media such as a local area network, the internet, or the digital satellite broadcast.

In the computer 900, the program can be installed in the recording unit 908 via the input/output interface 900 by attaching the removable medium 911 to the drive 910. Furthermore, the program can be received by the communication unit 909 via a wired or wireless transmission medium, and installed in the recording unit 908. In addition, the program can be pre-installed in the ROM 902 or the recording unit 908.

Here, the processing performed according to the program by the computer in the present specification is not necessarily performed in time series according to the order described as the flowcharts. In other words, the processing performed according to the program by the computer includes processing to be executed in parallel or independently (for example, parallel processing or a processing object). Furthermore, the program may be performed by one computer (processor) or dispersedly performed by a plurality of computers.

Note that, embodiments of the present technology are not limited to the above embodiment, and can be variously modified without departing from the scope of the present technology.

Furthermore, the present technology may have the following configurations:

(1)

A reception apparatus including:
- a first acquisition unit which acquires, preceding text format second signaling data to be transmitted in a lower-level layer than an internet protocol (IP) layer in a hierarchy of a protocol of an IP transmission system and containing control information independent of a service identified by an IP address, binary format first signaling data containing a flag indicating whether the second signaling data exists in digital broadcast using the IP transmission system;
- a second acquisition unit which acquires the second signaling data on the basis of the first signaling data; and
- a control unit which controls operation of the units which perform various types of processing on the basis of the second signaling data.

(2)

The reception apparatus according to (1), in which when the flag contained in the first signaling data indicates that the second signaling data exists, the second acquisition unit acquires, on the basis of identification information, which is contained in the first signaling data, of a stream in which the second signaling data is transmitted, the second signaling data from the stream.

(3)

The reception apparatus according to (2), in which
the first signaling data is a fast information channel (FIC) transmitted in a further lower-level layer than the layer in which the second signaling data is transmitted in the hierarchy of the protocol of the IP transmission system, and
the second signaling data is a service configuration description (SCD) indicating a configuration of the stream for every physical channel in a broadcast wave of the digital broadcast and a configuration of the service or a region rating description (RRD) containing rating information.

(4)

The reception apparatus according to (3), in which the first signaling data contains identification information for identifying the physical channel, identification information for identifying the stream, and identification information for identifying the service.

(5)

The reception apparatus according to (3) or (4), in which the first signaling data contains identification information for specifying a supply source of the service.

(6)

The reception apparatus according to any one of (3) to (5), in which the first signaling data contains information indicating a distribution route of third signaling data transmitted in a higher-level layer than the IP layer in the hierarchy of the protocol of the IP transmission system and containing control information for every service identified by the IP address.

(7)

The reception apparatus according to (2), in which the first signaling data is an emergency alert system (EAS) containing information on an emergency alert, and the second signaling data is an emergency alerting description (EAD) containing information on an emergency alert.

(8)

A reception method of a reception apparatus including the steps of:
by the reception apparatus,
acquiring, preceding text format second signaling data to be transmitted in a lower-level layer than an IP layer in a hierarchy of a protocol of an IP transmission system and containing control information independent of a service identified by an IP address, binary format first signaling data containing a flag indicating whether the second signaling data exists in digital broadcast using the IP transmission system;
acquiring the second signaling data on the basis of the first signaling data; and
controlling operation of the units which perform various types of processing on the basis of the second signaling data (9)

A transmission apparatus including:
a generation unit which generates text format second signaling data to be transmitted in a lower-level layer than an IP layer in a hierarchy of a protocol of an IP transmission system and containing control information independent of a service identified by an IP address, and binary format first signaling data containing a flag indicating whether the second signaling data exists in digital broadcast using the IP transmission system; and
a transmission unit which transmits the first signaling data and the second signaling data by the digital broadcast using the IP transmission system such that a reception apparatus acquires the first signaling data preceding the second signaling data.

(10)

The transmission apparatus according to (9), in which when the flag indicates that the second signaling data exists, the first signaling data contains identification information of a stream in which the second signaling data is transmitted.

(11)

The transmission apparatus according to (10), in which the first signaling data is a fast information channel (FIC) transmitted in a further lower-level layer than the layer in which the second signaling data is transmitted in the hierarchy of the protocol of the IP transmission system, and
the second signaling data is a service configuration description (SCD) indicating a configuration of the stream for every physical channel in a broadcast wave of the digital broadcast and a configuration of the service or a region rating description (RRD) containing rating information.

(12)

The transmission apparatus according to (11), in which the first signaling data contains identification information for identifying the physical channel, identification information for identifying the stream, and identification information for identifying the service.

(13)

The transmission apparatus according to (11) or (12), in which the first signaling data contains identification information for specifying a supply source of the service.

(14)

The transmission apparatus according to any one of (11) to (13), in which the first signaling data contains information indicating a distribution route of third signaling data transmitted in a higher-level layer than the IP layer in the hierarchy of the protocol of the IP transmission system and containing control information for every service identified by the IP address.

(15)

The transmission apparatus according to (10), in which the first signaling data is an emergency alert system (EAS) containing information on an emergency alert, and the second signaling data is an emergency alerting description (EAD) containing information on an emergency alert.

(16)

A transmission method of a transmission apparatus including the steps of:
by the transmission apparatus,
generating text format second signaling data to be transmitted in a lower-level layer than an IP layer in a hierarchy of a protocol of an IP transmission system and containing control information independent of a service identified by an IP address, and binary format first signaling data containing a flag indicating whether the second signaling data exists in digital broadcast using the IP transmission system; and
transmitting the first signaling data and the second signaling data by the digital broadcast using the IP transmission system such that a reception apparatus acquires the first signaling data preceding the second signaling data.

REFERENCE SIGNS LIST

1 Broadcast communication system
10 Transmission apparatus
20 Reception apparatus
30 Communication server
90 Internet
111 Signaling acquisition unit
113 Video data acquisition unit
115 Audio data acquisition unit
118 Transmission unit
212 Tuner
214 Control unit
217 Communication unit
251 first signaling acquisition unit
252 second signaling acquisition unit
253 Signaling analysis unit
254 Broadcast control unit
255 Communication control unit
900 Computer
901 CPU

The invention claimed is:

1. A reception apparatus comprising:
receiver circuitry configured to receive a broadcast signal, the broadcast signal including a flag, the flag indicating a presence or absence of first signaling data in the broadcast signal; and
control circuitry configured to:
    detect the flag;
    acquire the first signaling data from the broadcast signal, the first signaling data being transmitted in a first protocol layer of an Internet Protocol (IP) transmission system, the first signaling data including information indicating a location of second signaling data in the broadcast signal;
    acquire the second signaling data from the broadcast signal based on the information included in the first signaling data, the second signaling data being transmitted in a second protocol layer of the IP transmission system; and
    control an operation of the reception apparatus according to the first signaling data and the second signaling data.

2. The reception apparatus according to claim 1, wherein the first signaling data includes:
first identification information for identifying a stream in the broadcast signal, and second identification information for identifying a service.

3. The reception apparatus according to claim 1, wherein:
the first signaling data includes information about an emergency alert; and
the control circuitry is further configured to perform an emergency alert operation according to the information about the emergency alert.

4. The reception apparatus according to claim 1, wherein the second signaling data is text format data.

5. The reception apparatus according to claim 1, wherein the broadcast signal includes a component, and the control circuitry is configured to reproduce the component based on the second signaling data.

6. The reception apparatus according to claim 5, further comprising a display to display the component.

7. A reception method of a reception apparatus, the method comprising:
receiving, by receiver circuitry of the reception apparatus, a broadcast signal, the broadcast signal including a flag, the flag indicating a presence or absence of first signaling data in the broadcast signal;
detecting the flag by control circuitry of the reception apparatus;
acquiring, by control circuitry of the reception apparatus, the first signaling data from the broadcast signal, the first signaling data being transmitted in a first protocol layer of an Internet Protocol (IP) transmission system, the first signaling data including information indicating a location of second signaling data in the broadcast signal;
acquiring, by the control circuitry of the reception apparatus, the second signaling data from the broadcast signal based on the information included in the first signaling data, the second signaling data being transmitted in a second protocol layer of the IP transmission system; and
controlling, by the control circuitry of the reception apparatus, an operation of the reception apparatus according to the first signaling data and the second signaling data.

8. The reception method according to claim 7, wherein the first signaling data includes first identification information for identifying a stream in the broadcast signal, and second identification information for identifying a service.

9. The reception method according to claim 7, wherein the first signaling data includes information on an emergency alert, and the method further comprises:
performing an emergency alert operation according to the information on the emergency alert.

10. The reception method according to claim 7, wherein the second signaling data is text format data.

11. The method according to claim 7, wherein the broadcast signal includes a component, and the method further comprises reproducing the component based on the second signaling data.

12. The method according to claim 11, wherein the method further comprises displaying the component.

13. A non-transitory computer-readable medium storing instructions which when executed by a processor of a reception apparatus cause the processor to perform a method comprising:
detecting a flag indicating a presence or absence of first signaling data from in a broadcast signal;
acquiring the first signaling data from the broadcast signal, the first signaling data being transmitted in a first protocol layer of an Internet Protocol (IP) transmission system, the first signaling data including information indicating a location of second signaling data in the broadcast signal;
acquiring the second signaling data from the broadcast signal based on the information included in the first signaling data, the second signaling data being transmitted in a second protocol layer of the IP transmission system; and
controlling operation of the reception apparatus according to the first signaling data and the second signaling data.

14. The non-transitory computer-readable medium according to claim 13, wherein the first signaling data includes first identification information for identifying a stream in the broadcast signal, and second identification information for identifying a service.

15. The non-transitory computer-readable medium according to claim 13, wherein the first signaling data includes information on an emergency alert, and the non-transitory computer-readable medium includes instructions which when executed by the processor of the reception apparatus cause the processor to perform the method further including performing an emergency alert operation according to the information on the emergency alert.

16. The non-transitory computer-readable medium according to claim 13, wherein the second signaling data is text format data.

17. The non-transitory computer readable medium according to claim 13, wherein the broadcast signal includes a component, and the method further comprises reproducing the component based on the second signaling data.

18. The non-transitory computer readable medium according to claim 17, wherein the method further comprises displaying the component.

\* \* \* \* \*